US008266130B2

(12) United States Patent
Jones et al.

(10) Patent No.: US 8,266,130 B2
(45) Date of Patent: Sep. 11, 2012

(54) SEARCH TOOL PROVIDING OPTIONAL USE OF HUMAN SEARCH GUIDES

(75) Inventors: Scott A. Jones, Carmel, IN (US); Thomas E. Cooper, Carmel, IN (US)

(73) Assignee: ChaCha Search, Inc., Carmel, IN (US)

( * ) Notice: Subject to any disclaimer, the term of this patent is extended or adjusted under 35 U.S.C. 154(b) by 193 days.

(21) Appl. No.: 11/626,173

(22) Filed: Jan. 23, 2007

(65) Prior Publication Data

US 2007/0185841 A1    Aug. 9, 2007

Related U.S. Application Data

(63) Continuation-in-part of application No. 11/336,928, filed on Jan. 23, 2006, now Pat. No. 8,065,286, and a continuation-in-part of application No. 11/469,732, filed on Sep. 1, 2006.

(60) Provisional application No. 60/807,420, filed on Jul. 14, 2006.

(51) Int. Cl.
*G06F 7/00* (2006.01)

(52) U.S. Cl. .......................................... 707/706; 707/707

(58) Field of Classification Search ............... 707/3, 706, 707/707
See application file for complete search history.

(56) References Cited

U.S. PATENT DOCUMENTS

| 5,559,940 | A | 9/1996 | Hutson |
| 5,724,571 | A | 3/1998 | Woods |
| 5,732,259 | A | 3/1998 | Konno |
| 5,757,644 | A | 5/1998 | Jorgensen |
| 5,809,250 | A | 9/1998 | Kisor |
| 5,845,278 | A | 12/1998 | Kirsch |
| 5,862,223 | A | 1/1999 | Walker |
| 5,875,231 | A | 2/1999 | Farfan |
| 5,915,010 | A | 6/1999 | McCalmont |
| 5,948,054 | A | 9/1999 | Nielsen |
| 5,982,370 | A * | 11/1999 | Kamper ........................ 715/760 |
| 6,212,517 | B1 | 4/2001 | Sato |
| 6,223,165 | B1 | 4/2001 | Lauffer |
| 6,226,648 | B1 | 5/2001 | Appleman |
| 6,269,355 | B1 | 7/2001 | Grimse |
| 6,330,576 | B1 | 12/2001 | Mochizuki |
| 6,346,952 | B1 | 2/2002 | Shtivelman |
| 6,377,944 | B1 * | 4/2002 | Busey et al. ......................... 1/1 |
| 6,430,558 | B1 | 8/2002 | Delano |
| 6,434,549 | B1 | 8/2002 | Linetsky |

(Continued)

FOREIGN PATENT DOCUMENTS

EP    1209583    5/2002

(Continued)

OTHER PUBLICATIONS

Kenney et al. "Google Meets eBay", D-Lib Magazine, vol. 9 No. 6, Jun. 2003.*

(Continued)

*Primary Examiner* — Etienne Leroux
*Assistant Examiner* — Cindy Nguyen

(57) ABSTRACT

A method and system providing optional use of human search guides to allow a user to select between a human guide assisted search and an automated search. The user is provided with an option of submitting a query requesting assistance of one or more human guides, initiating a search without requesting assistance from human guide(s) using automated results, or a combination of both.

27 Claims, 17 Drawing Sheets

U.S. PATENT DOCUMENTS

| | | |
|---|---|---|
| 6,434,556 B1 | 8/2002 | Levin |
| 6,484,162 B1 | 11/2002 | Edlund |
| 6,507,841 B2 | 1/2003 | deVarax |
| 6,549,889 B2 | 4/2003 | Lauffer |
| 6,567,103 B1 | 5/2003 | Chaudhry |
| 6,578,010 B1 | 6/2003 | Teacherson |
| 6,578,022 B1 | 6/2003 | Foulger |
| 6,584,471 B1 | 6/2003 | Maclin |
| 6,621,505 B1 | 9/2003 | Beauchamp |
| 6,643,641 B1 | 11/2003 | Snyder |
| 6,675,159 B1 | 1/2004 | Lin |
| 6,735,632 B1 | 5/2004 | Kiraly |
| 6,745,178 B1 | 6/2004 | Emens |
| 6,760,916 B2 | 7/2004 | Holtz |
| 6,788,316 B1 | 9/2004 | Ma |
| 6,829,585 B1 | 12/2004 | Grewal |
| 6,845,369 B1 | 1/2005 | Rodenburg |
| 6,859,909 B1 | 2/2005 | Lerner |
| 6,873,982 B1 | 3/2005 | Bates |
| 6,895,406 B2 | 5/2005 | Fables |
| 6,901,394 B2 * | 5/2005 | Chauhan et al. ............... 706/60 |
| 6,924,827 B1 | 8/2005 | Gulati |
| 6,947,924 B2 | 9/2005 | Bates |
| 6,990,494 B2 | 1/2006 | Bates |
| 7,000,008 B2 | 2/2006 | Bautistu-Lloyd |
| 7,039,681 B2 | 5/2006 | Nolte |
| 7,047,279 B1 | 5/2006 | Beams |
| 7,054,848 B1 | 5/2006 | Lannert |
| 7,287,021 B2 * | 10/2007 | De Smet ........................ 707/3 |
| 7,822,765 B2 | 10/2010 | Back |
| 2001/0009013 A1 | 7/2001 | Appleman |
| 2001/0018662 A1 | 8/2001 | Lauffer |
| 2001/0029538 A1 | 10/2001 | Blockton |
| 2002/0053078 A1 | 5/2002 | Holtz |
| 2002/0062343 A1 | 5/2002 | Appleman |
| 2002/0083031 A1 | 6/2002 | DeVarax |
| 2002/0091836 A1 | 7/2002 | Moetteli |
| 2002/0099700 A1 | 7/2002 | Li |
| 2002/0107842 A1 | 8/2002 | Biebesheimer |
| 2002/0140715 A1 | 10/2002 | Smet |
| 2002/0147848 A1 | 10/2002 | Burgin |
| 2002/0164004 A1 | 11/2002 | Tamura |
| 2002/0167539 A1 * | 11/2002 | Brown et al. ............... 345/705 |
| 2002/0179614 A1 | 12/2002 | Rohlfs |
| 2003/0002445 A1 * | 1/2003 | Fullana et al. ............... 370/241 |
| 2003/0061201 A1 | 3/2003 | Greffenstett |
| 2003/0074303 A1 | 4/2003 | Gould |
| 2003/0101083 A1 * | 5/2003 | Venkatesh et al. ............... 705/8 |
| 2003/0108186 A1 | 6/2003 | Brown |
| 2003/0126136 A1 | 7/2003 | Omuigui |
| 2003/0140037 A1 | 7/2003 | Deh-Lee |
| 2003/0145001 A1 | 7/2003 | Craig et al. |
| 2003/0174818 A1 | 9/2003 | Hazenfield |
| 2003/0198325 A1 | 10/2003 | Bayne |
| 2003/0208535 A1 | 11/2003 | Appleman |
| 2003/0227479 A1 * | 12/2003 | Mizrahi et al. ............... 345/753 |
| 2004/0010484 A1 | 1/2004 | Foulger |
| 2004/0023644 A1 | 2/2004 | Montemer |
| 2004/0024752 A1 | 2/2004 | Manber et al. |
| 2004/0049541 A1 | 3/2004 | Swahn |
| 2004/0088286 A1 | 5/2004 | Hackleman |
| 2004/0107118 A1 | 6/2004 | Harnsberger |
| 2004/0111671 A1 | 6/2004 | Lu |
| 2004/0133469 A1 | 7/2004 | Chang |
| 2004/0203634 A1 | 10/2004 | Wang et al. |
| 2005/0010559 A1 | 1/2005 | Du |
| 2005/0026129 A1 | 2/2005 | Rogers |
| 2005/0055321 A1 | 3/2005 | Fratkina |
| 2005/0071741 A1 | 3/2005 | Acharya |
| 2005/0086290 A1 | 4/2005 | Joyce |
| 2005/0105712 A1 | 5/2005 | Williams |
| 2005/0114789 A1 | 5/2005 | Chang |
| 2005/0131866 A1 | 6/2005 | Badros |
| 2005/0136949 A1 | 6/2005 | Barnes |
| 2005/0154723 A1 * | 7/2005 | Liang ............... 707/3 |
| 2005/0165766 A1 | 7/2005 | Szabo |
| 2005/0187895 A1 | 8/2005 | Paya |
| 2005/0198021 A1 | 9/2005 | Wilcox |
| 2005/0198116 A1 | 9/2005 | Appleman |
| 2005/0210042 A1 | 9/2005 | Goedken |
| 2005/0273394 A1 | 12/2005 | Schonals |
| 2005/0278633 A1 * | 12/2005 | Kemp ............... 715/713 |
| 2005/0289124 A1 | 12/2005 | Kaiser et al. |
| 2006/0002607 A1 | 1/2006 | Boncyk |
| 2006/0010105 A1 | 1/2006 | Sarukkai |
| 2006/0026152 A1 | 2/2006 | Zeng |
| 2006/0053109 A1 | 3/2006 | Sudanagunta |
| 2006/0053224 A1 | 3/2006 | Subramanium |
| 2006/0070012 A1 | 3/2006 | Milener |
| 2006/0074984 A1 | 4/2006 | Milener |
| 2006/0085529 A1 | 4/2006 | Ziegler |
| 2006/0129536 A1 | 6/2006 | Foulger |
| 2006/0155694 A1 | 7/2006 | Chowdhury |
| 2006/0167896 A1 | 7/2006 | Kapur et al. |
| 2006/0288087 A1 | 12/2006 | Sun |
| 2007/0005344 A1 | 1/2007 | Sandor |
| 2007/0005698 A1 | 1/2007 | Kumar |
| 2007/0014537 A1 | 1/2007 | Weseman |
| 2007/0038601 A1 * | 2/2007 | Guha ............... 707/3 |
| 2007/0129054 A1 | 6/2007 | Andronikov |
| 2007/0143262 A1 * | 6/2007 | Kasperski ............... 707/3 |
| 2007/0260601 A1 * | 11/2007 | Thompson et al. ............... 707/5 |
| 2008/0091536 A1 | 4/2008 | Wolmuth |
| 2010/0138402 A1 | 6/2010 | Burroughs |

FOREIGN PATENT DOCUMENTS

| | | |
|---|---|---|
| EP | 1209583 A2 | 5/2002 |
| EP | 1 241 886 | 9/2002 |
| WO | WO 01/86928 | 11/2001 |
| WO | WO 2004/057473 | 7/2004 |
| WO | WO2007052285 A2 | 5/2007 |

OTHER PUBLICATIONS

"Google Meets eBay", Kenney et al., D-Lib Magazine, Jun. 2003.*

U.S. Appl. No. 11/336,928, filed Jan. 23, 2006, Scott A. Jones, Chacha Search Inc.

U.S. Appl. No. 11/777,505, filed Jul. 13, 2007, Scott A. Jones et al., Chacha Search Inc.

U.S. Appl. No. 11/779,502, filed Jul. 18, 2007, Scott A. Jones et al., Chacha Search Inc.

U.S. Appl. No. 11/652,506, filed Jan. 12, 2007, Scott A. Jones et al., Chacha Search Inc.

U.S. Appl. No. 11/780,297, filed Jul. 19, 2007, Scott A. Jones et al., Chacha Search Inc.

U.S. Appl. No. 11/780,241, filed Jul. 19, 2007, Scott A. Jones et al., Chacha Search Inc.

U.S. Appl. No. 11/819,719, filed Jun. 28, 2007, Scott A. Jones et al., Chacha Search Inc.

U.S. Appl. No. 11/835,016, filed Aug. 7, 2007, Scott A. Jones et al., Chacha Search Inc.

U.S. Appl. No. 11/780,329, filed Jul. 19, 2007, Scott A. Jones et al., Chacha Search Inc.

U.S. Appl. No. 11/834,911, filed Aug. 7, 2007, Scott A. Jones, Chacha Search Inc.

U.S. Appl. No. 11/647,286, filed Dec. 29, 2006, Scott A. Jones et al., Chacha Search Inc.

U.S. Appl. No. 11/469,732, filed Sep. 1, 2006, Scott A. Jones et al., Chacha Search Inc.

U.S. Appl. No. 11/647,437, filed Dec. 29, 2006, Scott A. Jones et al., Chacha Search Inc.

U.S. Appl. No. 11/647,309, filed Dec. 29, 2006, Scott A. Jones et al., Chacha Search Inc.

U.S. Appl. No. 11/774,852, filed Jul. 9, 2007, Scott A. Jones et al., Chacha Search Inc.

U.S. Appl. No. 11/782,275, filed Jul. 24, 2007, Scott A. Jones, Chacha Search Inc.

U.S. Appl. No. 11/970,842, filed Jan. 8, 2008, Scott A. Jones et al., Chacha Search Inc.

"Library Question—Answer—Question #1205187", Santa Monica Public Library's Question Point, Dec. 2005.

Walter S. Mossberg et al., "What You Should Know About Web Searches—A Guide to Search-Engine Features", Wall Street Journal, Dec. 2005, p. D1.

"Connotate—Beyond Search", Connotate Technologies, http://www.connotate.com/beyond_search/beyond_search.asp, printed Feb. 21, 2006.
Wired Magazine, "Serf Engine", http://www.wired.com/wired/archive/8.07/mustread.html?pg=13, printed Jan. 26, 2006.
"SmartDraw Viewer", http://www.smartdraw.com/product/viewer.htm, printed Mar. 21, 2006.
"Google Answers", http://www.google.com, printed Dec. 13, 2005.
"Leave the Surfing to the Pros, Please", The Travel Technologist, Mar. 2, 2000, http://www.elliott.org/technology/2000/inetnow.htm, printed Jan. 26, 2006.
"INetNow.com", Breakthrough Technologies, http://www/breakthrough-tech.com/projects/inetnow/, printed Jan. 26, 2006.
Bob Tedeschi, "Google's Shadow Payroll is Not Such a Secret Anymore", The New York Times, E-Commerce Report, Jan. 16, 2006.
"Gravee Search", http://www.gravee.com, printed Mar. 21, 2006.
"Just Answer", http://www.justanswer.com/forum_topics.asp, printed Mar. 21, 2006.
"Ask Now", http://www.asknow.org/chat/chat.cfm, printed Dec. 13, 2005.
"All Experts", http://www.allexperts.com/central/service2.shtml, printed Mar. 21, 2006.
"Keyword Research Guide", WordTracker Keywords, http://www.wordtracker.com.
Olga Kharif, "Microsoft Gets Social", Business Week Online, Apr. 12, 2006, www.businessweek.com.
"CHI, a Collaborative Human Interpreter", Google Blogoscoped, Mar. 25, 2005, http://blog.outer-court.com/archive/2005-03-25-n43.html.
"CHI Image Sorting", Google Blogoscoped, Mar. 28, 2005, http://blog-outer-court.com/archive/2005-03-28-n53.html.
"Amazon's Mechanical Turk", Google Blogoscoped, Nov. 4, 2005, http://blog.outer-court.com/archive/2005-11-04-n69.html.
Yochai Benkler, "Coase's Penguin, or, Linux and The Nature of the Firm", The Yale Law Journal, vol. 112, 2002.
"Google Answers", retrieved from Internet at URL: http://answers.google.com/answers/?gsessionidJ_TcHewne3Y on Sep. 25, 2007.
Nancy Lambert, "BountyQuest Revisited: The Coin Has Two Sides", Apr. 2, 2001, Retrieved from Internet at URL: http://newsbreaks.infotoday.com/nbReader.asp?ArticleId=17623 on Sep. 25, 2007.
"AllExperts Questions & Answers", retrieved from Internet at URL: http://www.allexperts.com/ on Sep. 25, 2007.
"AskAnything Technologies", retrieved from Internet at URL: http://www.askanything.com/ on Sep. 25, 2007.
"BumperBrain", retrieved from Internet at URL: http://www.bumperbrain.com/ on Sep. 25, 2007.
"Kasamba", retrieved from Internet at URL: http://www.kasamba.com on Sep. 25, 2007.
International Search Report issued Jan. 28, 2008 in PCT/US07/75369.
Interriational Search Report issued Feb. 12, 2008 in PCT/US07/60467.
International Search Report issued Feb. 27, 2008 in PCT/US07/60459.
International Search Report issued Feb. 15, 2008 in PCT/US07/60468.
International Search Report issued Feb. 7, 2008 in PCT/US07/60472.
Carmel et al., "Searching XML Documents via XML Fragments," 2003, ACM, pp. 151-158.
Karat at al., "Patterns of Entry and Correction in Large Vocabulary Continuous Speech Recognition Systems," 1999, ACM, pp. 568-575.
Google Tutor, "Googling from your Mobile Phone—no Web Browser Needed!," 2005, Google Tour.
Varshney et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.
U.S. Appl. No. 11/647,286, filed Dec. 29, 2006, Scott A. Jones, Cha Cha Search, Inc.
U.S. Appl. No. 11,469,732, filed Sep. 1, 2006, Scott A. Jones, Cha Cha Search, Inc.
U.S. Appl. No. 11/336,928, filed Jan. 23, 2006 Scott A. Jones, Cha Cha Search, Inc.
U.S. Appl. No. 11/647,437, filed Dec. 29, 2006, Scott A. Jones, Cha Cha Search, Inc.
International Search Report issued on Jun. 19, 2008 in corresponding PCT Application No. PCT/US07/89223.
International Preliminary Report dated Aug. 7, 2008, issued in PCT Patent Application No. PCT/US2007/060472.
iNetNow, "iNetNow Announces the First Human-Powered Internet Search Engine: New Company Allows Access to Experienced, Web Surfers via Phone 24 Hours a Day, 7 Days a Week," Business Wire 2000.
International Search Report dated Feb. 27, 2008, issued in PCT Patent Application PCT/US 07/60459.
International Preliminary Report dated Aug. 7, 2008, issued in PCT Patent Application No. PCT/US2007/060459.
International Preliminary Report dated Feb. 12, 2008, issued in PCT Patent Application PCT/US2007/60467.
International Search Report dated Feb. 12, 2008, issued in PCT Patent Application PCT/US2007/60467.
International Search Report dated Feb. 15, 2008, issued in PCT Patent Application PCT/US 2007/060468.
International Preliminary Report dated Feb. 15, 2008, issued in PCT Patent Application PCT/US 2007/060468.
Yuwono et al., "A World Wide Web Resource Discovery System," The Hong Kong University of Science and Technology Library, 1995.
Non-Final Office Action mailed Aug. 8, 2011, U.S. Appl. No. 13/098,782, filed May 2, 2011.
Extended European Search Report issued Oct. 6, 2011 in PCT/US2007060472 (EU App 11176867.7).
AU 2007206022 Examiners First Report Corresponding to Copending U.S. Appl. No. 11/336,928 PCT/US/2007060472 issued Mar. 29, 2011.
AU 2007208181 Examiners First Report Corresponding to Copending U.S. Appl. No. 11/647,286 PCT/US/2007060459 issued Mar. 29, 2011.
AU 2007211160 Examiners First Report Corresponding to Copending U.S. Appl. No. 11/647,437 PCT/US/2007060468 issued Mar. 23, 2011.
EP App. 7717987.7 EPO Communication Corresponding to Copending U.S. Appl. No. 11/336,928 PCT/US/2007060472 issued May 12, 2009.
EP App. 7717987.7 EPO Communication Corresponding to Copending U.S. Appl. No. 11/336,928 PCT/US/2007060472 issued Aug. 13, 2010.
EP App. 7717987.7 EPO Communication Corresponding to Copending U.S. Appl. No. 11/336,928 PCT/US/2007060472 issued Sep. 6, 2011.
EP App. 7762508.5 EPO Communication Corresponding to Copending U.S. Appl. No. 11/647,286 PCT/US/2007060459 issued Jan. 25, 2012.
EP App. 7762508.5 EPO Communication Corresponding to Copending U.S. Appl. No. 11/647,286 PCT/US/2007060459 issued Aug. 13, 2010.
EP App. 7762604.2 EPO Communication Corresponding to Copending U.S. Appl. No. 11/469,732 PCT/US/2007060467 issued Jan. 25, 2012.
EP App. 7762604.2 EPO Communication Corresponding to Copending U.S. Appl. No. 11/469,732 PCT/US/2007060467 issued May 12, 2009.
EP App. 7762604.2 EPO Communication Corresponding to Copending U.S. Appl. No. 11/469,732 PCT/US/2007060467 issued Aug. 13, 2010.
EP App. 7762823.8 EPO Communication Corresponding to Copending U.S. Appl. No. 11/647,437 PCT/US/2007060468 issued Jun. 7, 2011.
Final Office Action Copending U.S. Appl. No. 11/336,928 Issued Mar. 16, 2011.
Final Office Action Copending U.S. Appl. No. 11/336,928 Issued Sep. 2, 2009.
Final Office Action Copending U.S. Appl. No. 11/647,286 Issued Nov. 12, 2009.

Final Office Action Copending U.S. Appl. No. 11/469,732 Issued Jun. 7, 2010.
Final Office Action Copending U.S. Appl. No. 11/469,732 Issued Jun. 22, 2011.
Final Office Action Copending U.S. Appl. No. 11/469,732 Issued Aug. 20, 2009.
Final Office Action Copending U.S. Appl. No. 11/647,473 Issued Oct. 28, 2009.
Final Office Action Copending U.S. Appl. No. 13/098,782 Issued Dec. 7, 2012.
JP 2008-551499 Examiners First Report Corresponding to Copending U.S. Appl. No. 11/469,732 PCT/US/2007060467 issued Feb. 21, 2012.
JP 2008-551500 Examiners First Report Corresponding to Copending U.S. Appl. No. 11/647,437 PCT/US/2007060468 issued Oct. 18, 2011.
Non Final Office Action Copending U.S. Appl. No. 11/336,928 Issued May 13, 2008.
Non Final Office Action Copending U.S. Appl. No. 11/336,928 Issued Sep. 29, 2010.
Non Final Office Action Copending U.S. Appl. No. 13/241,363 Issued Sep. 23, 2011.
Non Final Office Action Copending U.S. Appl. No. 11/647,286 Issued Mar. 31, 2009.
Non Final Office Action Copending U.S. Appl. No. 11/647,286 Issued Sep. 29, 2010.
Non Final Office Action Copending U.S. Appl. No. 11/469,732 Issued Feb. 1, 2010.
Non Final Office Action Copending U.S. Appl. No. 11/469,732 Issued Feb. 2, 2011.
Non Final Office Action Copending U.S. Appl. No. 11/469,732 Issued Mar. 31, 2009.
Non Final Office Action Copending U.S. Appl. No. 11/647,473 Issued Dec. 4, 2012.
Non Final Office Action Copending U.S. Appl. No. 11/647,473 Issued May 26, 2009.
Non Final Office Action Copending U.S. Appl. No. 13/098,782 Issued Aug. 8, 2011.
Notice of Allowance Copending U.S. Appl. No. 11/336,928.
Notice of Allowance Copending U.S. Appl. No. 11/647,286.
Notice of Allowance Copending U.S. Appl. No. 11/469,732.
NZ 570640 First Patentability Report Corresponding to Copending U.S. Appl. No. 11/647,286 PCT/US/2007060459 issued Jan. 20, 2010.
NZ 570640 Second Patentability Report Corresponding to Copending U.S. Appl. No. 11/647,286 PCT/US/2007060459 issued May 5, 2011.
NZ 570643 First Patentability Report Corresponding to Copending U.S. Appl. No. 11/469,732 PCT/US/2007060467 issued Jan. 20, 2010.
NZ 570643 Second Patentability Report Corresponding to Copending U.S. Appl. No. 11/469,732 PCT/US/2007060467 issued Apr. 27, 2011.
NZ 570644 First Patentability Report Corresponding to Copending U.S. Appl. No. 11/647,437 PCT/US/2007060468 issued Dec. 18, 2009.
NZ 570644 Second Patentability Report Corresponding to Copending U.S. Appl. No. 11/647,437 PCT/US/2007060468 issued May 5, 2011.
NZ 570644 Third Patentability Report Corresponding to Copending U.S. Appl. No. 11/647,437 PCT/US/2007060468 issued Oct. 11, 2011.
NZ 570671 First Patentability Report Corresponding to Copending U.S. Appl. No. 11/336,928 PCT/US/2007060472 issued Jan. 20, 2010.
NZ 570671 Second Patentability Report Corresponding to Copending U.S. Appl. No. 11/336,928 PCT/US/2007060472 issued Mar. 27, 2011.
SIPO 200780010282.1 First Office Action Corresponding to Copending U.S. Appl. No. 11/336,928 PCT/US/2007060472 issued May 12, 2010.
SIPO 200780010282.1 Second Office Action Corresponding to Copending U.S. Appl. No. 11/336,928 PCT/US/2007060472 issued Jul. 25, 2011.
SIPO 200780010292.5 First Office Action Corresponding to Copending U.S. Appl. No. 11/469,732 PCT/US/2007060467 issued May 12, 2010.
SIPO 200780010292.5 Second Office Action Corresponding to Copending U.S. Appl. No. 11/469,732 PCT/US/2007060467 issued Sep. 26, 2010.
SIPO 200780010292.5 Third Office Action Corresponding to Copending U.S. Appl. No. 11/469,732 PCT/US/2007060467 issued Apr. 15, 2011.

* cited by examiner

210

SEARCH TOOL PROVIDING OPTIONAL USE OF HUMAN SEARCH GUIDES

CROSS-REFERENCE TO RELATED APPLICATIONS

This application is related to and claims the benefit of U.S. Application Ser. No. 60/807,420, filed Jul. 14, 2006, inventor Scott A. Jones, et al., titled A SEARCH TOOL PROVIDING OPTIONAL USE OF HUMAN SEARCH GUIDES and is a continuation-in-part of U.S. application Ser. No. 11/336,928, titled A SCALABLE SEARCH SYSTEM USING HUMAN SEARCHERS, inventor Scott A. Jones, filed Jan. 23, 2006 now U.S. Pat. No. 8,065,286 and U.S. application Ser. No. 11/469,732 titled A SEARCH TOOL PROVIDING OPTIONAL USE OF HUMAN SEARCH GUIDES, inventor Scott A. Jones, filed Sep. 1, 2006, in the United States Patent and Trademark Office, the disclosures of all of which are incorporated herein by reference.

BACKGROUND

1. Field

The present invention is directed to an automated tool for a search and, more particularly, to providing search options including submitting a search to human guide(s) and/or searching without assistance of human guide(s).

2. Description of the Related Art

An Internet search engine available from Google®, Yahoo®, etc., may be utilized to conduct a search and sometimes desired information is obtained from results returned by the search engine. Such search engines provide a user with a list of search results, forcing the user to look through the list of results to obtain needed information. Further, a user may be required to repeat a search using a different search engine or another resource to retrieve relevant results. While some search engines and other resources available over the Internet provide better results for searches conducted in relation to a specific subject matter, a user must generally have experience in conducting searches to determine which resource(s) produce relevant information for a given subject matter.

Meta search engines such as Jux2™, Dogpile®, etc., submit a query to multiple search engines and return results from the search engines; however, search engines, Internet directories such as LookSmart® and other similar information resources provide comprehensive listings of web pages believed to be relevant to providing an answer to a query submitted by a user and require the user to conduct additional searching to locate desired information.

Attempts have been made to have humans answer users' questions via a variety of mechanisms including via e-mail, information posted at websites, and via library reference desks that are connected to users via "chat" sessions. However, there are many limitations imposed by these and other offerings including having limited pools of "experts", having latency in delivering results, having helpers who are not sufficiently knowledgeable or targeted provide optimal results, etc. In addition, these offerings do not identify search resources without the question being submitted to a human and do not address situations where a user may not want to submit the question to be answered by a human, for example, due to privacy concerns, difficulty phrasing a query or question, desire to see immediate results and/or learn about a subject instead of being simply provided with an answer, or for any other reason for searching for information oneself.

Although various types of search engines and other resources are available for locating information via the Internet, there is a need for a search tool enabling optional use of human search guide(s) and/or resource(s) selected by the human search guide(s) to increase probability of obtaining relevant results.

SUMMARY

A system and method are disclosed for optional use of human search guides by allowing a user to select between a human assisted search and an automated search and initiating a search responsive to the selection.

The system and method provide an infrastructure to enable human search guide(s) to conduct a search when requested by a user, to allow the user to conduct the search without the human search guide(s) when assistance is not requested and a combination of both.

When requested to assist a user, a guide may provide results based on a search using typical search engine(s) and/or information obtained by the guide that is beyond what is currently available via typical search engines.

The system includes a user device allowing a user to enter a query and select one of an automated and human assisted search and a system initiating a search responsive to the selection.

An interface is disclosed that includes a query field for entering a query to be searched and a selection control indicating whether the query is to be searched by one of a human and automatically.

The method disclosed provides selectable options for submitting a query, directs the query to a human guide for a search upon selection of a first of the selectable options and executes the search without requiring the human guide upon selection of a second of the selectable options.

The method and system disclosed allow selection between a human assisted search, an automated search and both the human assisted search and the automated search for initiating a search.

The disclosed method and system provide a default way to get results for users (information seekers) when human guides are not available, when a query is submitted for a search without requesting human guide assistance, or when human guide(s) are not performing sufficiently fast or producing sufficiently relevant results where these "last resort" answers may be provided by relaying the query to traditional search engines and returning results to users, similar to the operation of meta-search engines in which users may be able to pick the default search engine to use as the "default" solution.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
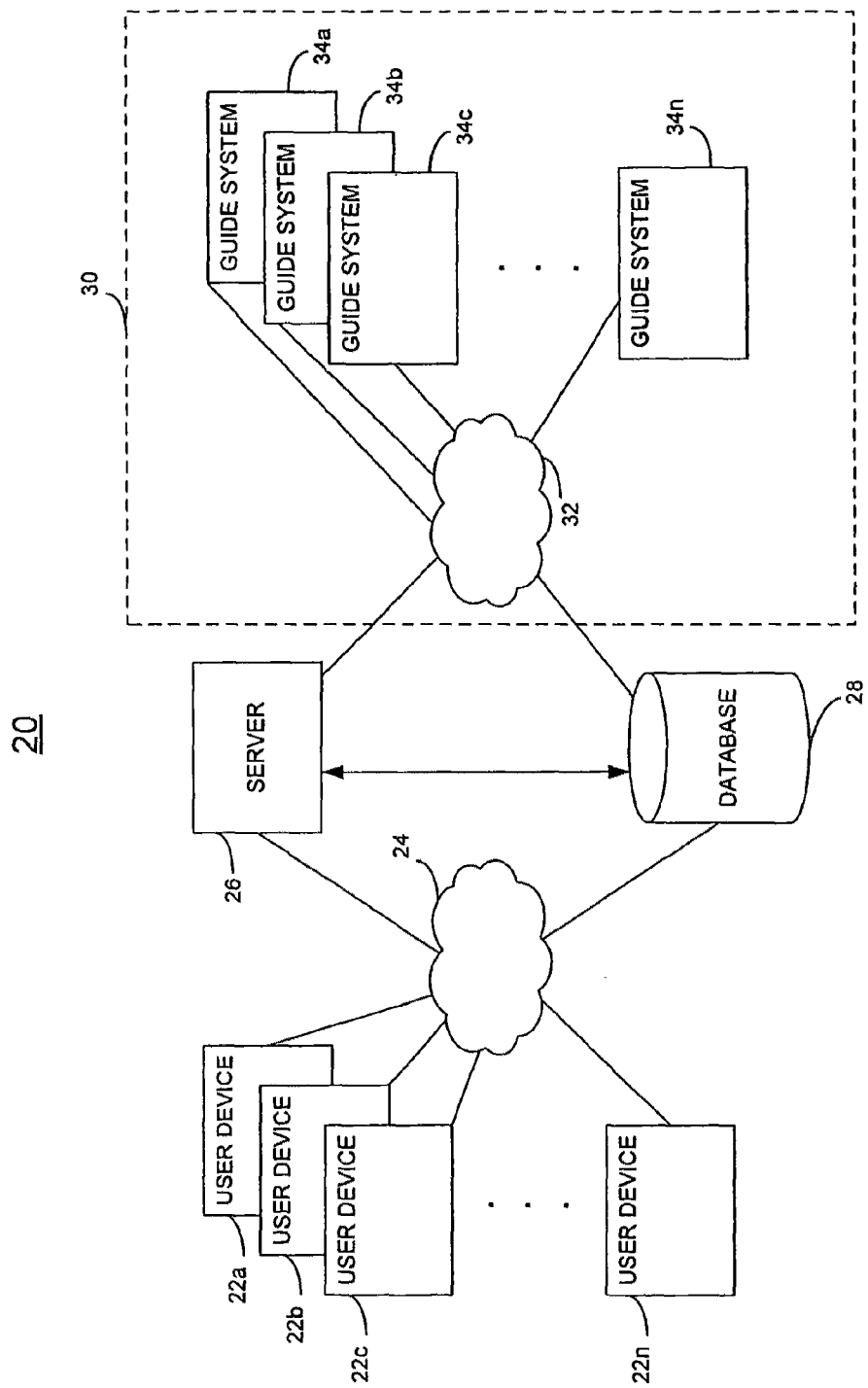
FIG. 1 is a block diagram of a system configured to perform submission of search request(s) and delivery of results.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

To overcome drawbacks of known search tools, the disclosed system provides a choice between submitting a request to human search guide(s), conducting a search without guide assistance, or a combination of the two. A request submitted by an information seeker (a user) may be a fully-formed question, or other sentence, keyword(s) or a search phrase, such as, for example, "what is the closing time of Chez Panisse," "who won the 1960 World Series," information pertaining to a medical illness, or any other type of query. A guide (also referred to herein as a provider, a searcher or a PaidSearcher™) may be a human searcher who has registered to handle requests and may be a professional, an amateur and/or a volunteer searcher, as disclosed in U.S. patent application Ser. No. 11/336,928, titled A SCALABLE SEARCH SYSTEM USING HUMAN SEARCHERS, inventor Scott A. Jones, filed Jan. 23, 2006. A user (also referred to herein as an information seeker or InfoSeeker™) is used herein to refer to a person or a web service submitting a search request seeking information for said user or on behalf of another person or organization.

FIG. 1 illustrates an embodiment of a system 20 for receiving search request(s) and delivering result(s) in response to the search request(s). As shown in FIG. 1, the system 20 may include user devices 22 including user device 22a through 22n. Each user device 22 may be a desktop or laptop computer system, a handheld computer such as a personal digital assistant (PDA), a basic cellular telephone, a text-enabled cellular telephone or any other general purpose device that allows a user to submit a request. The user devices 22 may also be typical touch-tone telephones, two-way radios or any other communication device that allows the user to talk over a distance. The communication system can include packet switched facilities, such as the Internet, circuit switched facilities, such as the public switched telephone network, radio based facilities, such as a wireless network, etc. Search requests from users are submitted to system 20 using user devices 22 coupled with server 26 via network 24.

The system 20 includes database 28 accessible by the server 26. The database 28 may maintain information about guides, requests submitted from the user devices 22, results generated by the guides in response to the requests, and resources utilized by the guides to obtain the results including information previously gathered by guides and category or keyword in relation to requests and/or results. For example, the database 28 may maintain a record related to a category or a keyword of a submitted request, and/or resource(s) utilized for returning results to the request. A table relationship diagram illustrating a record of resources used by guides and/or providers for conducting searches pertaining to a category is explained in further detail below with respect to FIG. 9.

The resources maintained in the database 28 may include search engines, Internet directories, private databases accessible to users such as a database of information previously gathered by guide(s), results stored based on previous requests including data obtained by guide(s) from non-electronic sources such as a book, knowledge base of the guide, etc. However, the information maintained in the database 28 is not limited to any particular type and may include results obtained using typical search capabilities that utilize spidering, indexing, page ranking, etc., including current information retrieval procedures utilized by search engines such as Google®, Yahoo®, MSN®, etc. In one embodiment, system 20 provides an option of submitting a request from the user devices 22 for a guide assisted search 30 via the network 32 or another option of directly submitting a request from a user to resource(s) identified in the database 28 based on keywords or categories extracted from the request, when the user opts to conduct the search without guide assistance.

The database 28 may include cross-linked entries for query, keyword, guide, user, advertisement, keyword and categories. Within these structures, there include entries for logged-in status of guide or searcher (availability), rank (or weighting) of guide rank (or weighting) of keyword, guide statistics such as number of searches, number of accepted (by user) searches, user identification (and/or IP address of user), name, address, demographics about users and guides, search results, advertisements (game, video, text, audio, etc.), advertisement statistics, accounting information, anonymity flags for user and guide, guide availability, query clarification and request, and an indication as to whether the guide is available for general searches, query follow-on, etc. The statistics information for a guide may include the total number of searches, the number of successful searches, the average speed of the guide, the latency of the guide before starting and ending a search, the average number of results returned by the guide, the availability time of the guide, etc.

The server 26 connected with guide systems 34 via network 32 may receive search requests from the user devices 22, and when requested to do so by users (information seekers) of the user devices 22, submits the search requests to one or more of the guide systems 34 to perform a search, e.g., as disclosed in U.S. patent application Ser. No. 11/336,928. For example, when a user submits a search request in system 20 seeking information and selects an option for human guide assistance in conducting a search, the server 26 submits the request to one or more of the guide systems 34 via the network 32.

The server 26 processes arriving search requests (queries) by determining which guides or searchers are available to search for the information being requested, based upon factors such as the guides being logged in, guides who are signed up for a keyword or category, the ranking of the guide based on previous performance, etc. The server 26 may also determine if a particular query has been queried previously and can send a response to a user with previously obtained search results without necessarily invoking a human guide.

Similar to the user devices 22, the guide systems 34 may be any text- or speech-based systems such as a desktop or laptop system, a handheld device such as a PDA, a cellular telephone, a specialized terminal, or any other source that allows a guide to receive and respond to a request submitted via text or speech entry.

When a guide registers with the system 20, the guide may identify a category, keyword, or an area of interest for which the guide is willing to accept search requests. Accordingly, when a request is submitted from one of the user devices 22 requesting guide assistance, the system 20 correlates the request with one or more guides based on one or more category, keyword or area of interest related to the requests. For example, when a user submits a search request pertaining to the category "literature" and requests guide assistance, the search request is delivered to one or more of the guides registered for the category "literature."

A searcher may sign up for multiple keywords in a query, (e.g. a guide might be signed up for both "baseball" and "world series"), then that keyword guide may take priority over fewer-keyword guide candidates who are only signed up for fewer matching keywords in the search query phrase (e.g. a guide or searcher who is signed up for either "baseball" or "world series" but not both).

If no guide is identified for a query phrase, then the server 26 can either forward the query to "generalist searchers" who will attempt to answer queries in any category. Alternatively, the system 20 may shuttle the query to another search engine and/or meta-search engine in an attempt to provide the user with a base level of functionality that is never worse than other search engines. The results are passed back to the user. Also, the query may be passed to a system of experts who answer questions on a website such as Google® Answers or Yahoo® Answers, and the user may be given a pointer to the location of the query which may be answered in the future. These systems may not give real-time feedback, but the user may check back in the future.

When a user opts to conduct a search without guide assistance, the request input by the user may be submitted to resource(s) used by guides registered for handling requests pertaining to the subject matter of the request. The resource(s) may be supplied to the user based on various factors such as subject matter or category of the request submitted by the user, use of the resource(s) by guide(s) for one or more previous searches related to the request, resources selected by system administrator(s) or highly expert searcher(s) selected by the system administrator(s) as being most likely to produce relevant results, etc. For example, when a user's request relates to the category "health" and 60% of guide(s) registered for handling searches related to the category "health" use the web site WebMD.com as a resource for retrieving information, the request submitted by the user may be submitted to a search tool at the WebMD.com site, and the results of this "unassisted search" may be supplied to the user. Alternatively, when a user opts to conduct a search without a guide, the search might be performed using typical search engine capabilities including those employed by Google®, Yahoo®, MSN®, Ask®, etc. In other words, searching without a guide may or may not utilize resources that were picked by a human guide. Resources and results might also be located using spidering (or web crawling), indexing, page ranking and any other information retrieval criteria that may be used to obtain results.

As such, even when a user conducts a search without guide assistance, the probability of obtaining relevant results is increased by supplying results to the user from resource(s) used by human guides for conducting searches related to the category or keyword of the user's request. When a keyword has no resources associated with it, then resource(s) of the category of the keyword may be utilized. When no resources are available for a given keyword and/or category, then general purpose resources may be utilized, including general search engines such as Dogpile®, Google®, MSN®, Yahoo®, etc., or any other source that may be used to obtain information. When no keyword or category can be identified in the search, general resource(s) are used. While this is similar to a search by a single or meta search engine, in one embodiment it may only occur as a last resort, and the request can be easily re-submitted to a guide if the results are unsatisfactory.

A user opting to conduct a search without guide assistance may also be provided with information stored in the database 28 including responses to previous requests, data gathered by guide(s) for responding to requests, etc., which may be utilized to produce automated results in response to a request by the user. For example, a guide knowledgeable in a particular subject matter may memorialize information pertaining to the subject matter, which in turn may be provided as an automated result to a user opting to conduct a search without guide assistance.

Figure 2:
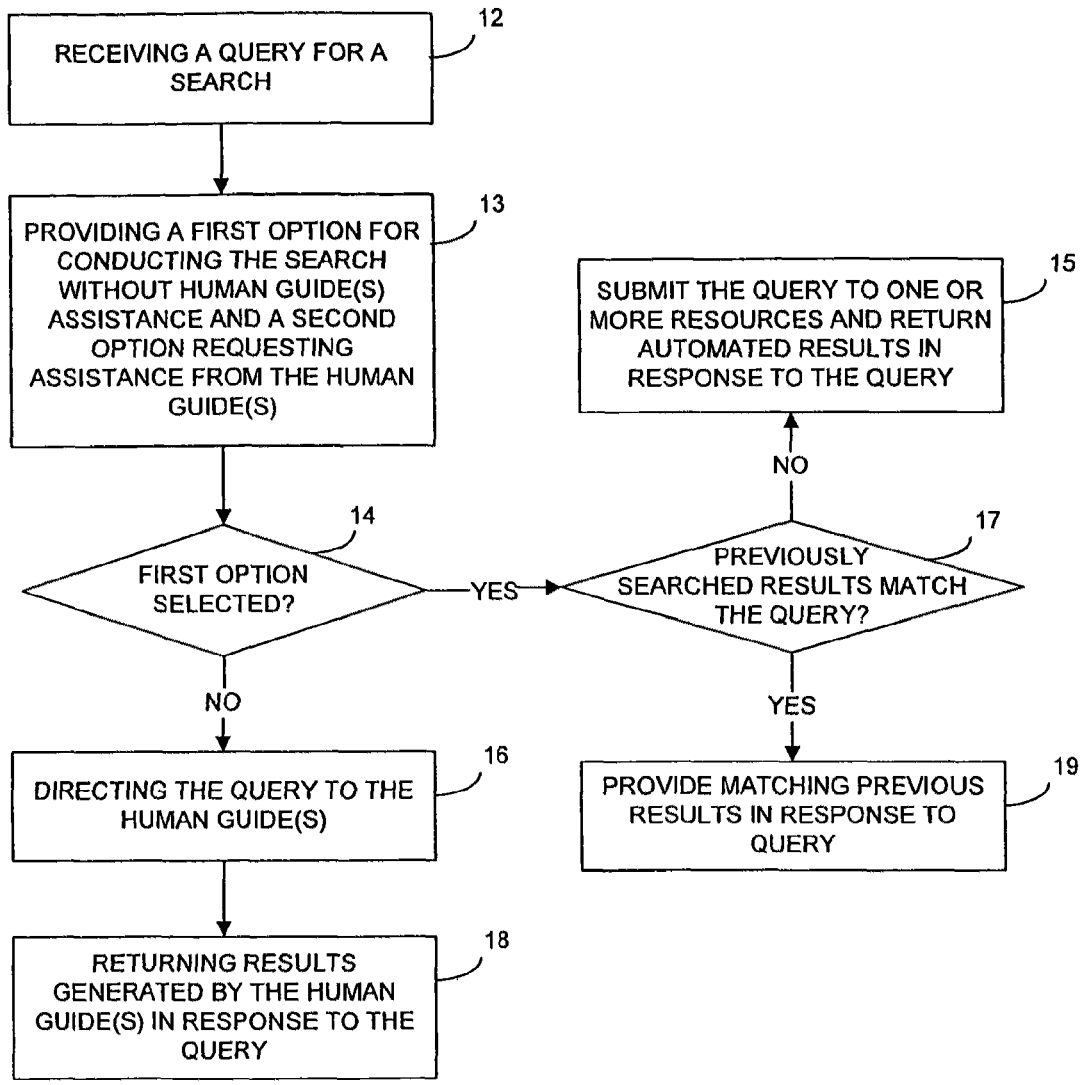
FIG. 2 is a flowchart for optional use of human guide(s) assistance for a search.

FIG. 2 illustrates process 10 for providing optional use of human guide(s) for conducting a search. As shown in FIG. 2, process 10 begins by receiving 12 a query for a search. After receiving 12 the query, process 10 moves to providing 13 a first option for conducting the search without human guide(s) assistance and a second option requesting assistance from the human guide(s) for the search. For example, when a user submits a request to the system 20 (FIG. 1), the user is prompted to select from first and second options provided 13, using which the user may opt to conduct the search without guide assistance or request guide assistance for conducting the search, respectively.

Subsequent to providing 13 first and second options, the process 10 moves to determining selection 14 of the first option for conducting the search without human guide(s) assistance. When determining selection 14 of the first option, process 10 continues by determining whether previously searched results match 17 the query. When determining that there is one or more previously searched results matching 17 the query, process 10 moves to providing 19 matching previous results in response to the query. For example, one or more previous search results generated in response to a previous query pertaining to the final four teams of the 2006 NCAA Basketball Championship may be provided as a response to a current query pertaining to a similar subject matter. The matching 17 may include comparing keyword(s) of the current query with the keyword(s) of previous queries for an exact, partial or fuzzy (highly similar) match. On the other hand, upon determination that there are no previous search results matching the query, process 10 submits the query to one or more resources and returns automated results 15 in response to the query.

When determining that the first option is not selected, process 10 moves to directing 16 the query to the human guide(s). For example, a user who has knowledge of resources capable of returning relevant results for searches pertaining to a particular subject matter may opt to conduct a search without guide assistance while the same user may choose to submit a query directed to another subject matter and request a guide assisted search.

A query may be submitted to one or more resources for returning automated results 15 using existing information retrieval procedures when a user selects to conduct a search without assistance of human guide(s). For example, known methods of browsing through information indexed by existing search engines or indexed "in-house" such as previous search results stored in a database may be used to generate automated results when a user selects to search without assistance from human guide(s).

After the query is directed 16 to the human guide(s), results generated 18 by the human guide(s) are provided in response to the query. In contrast to the automated results 15 returned in response to selection 14 to conduct the search without human guide(s), the search is conducted by the human guide(s) by directing 16 the query to the human guide(s). For example, a guide having knowledge of a particular subject matter may execute a real-time search in response to the query, generate results in response thereto and provide the results to the user who selected to request assistance from the guide.

Figure 3:
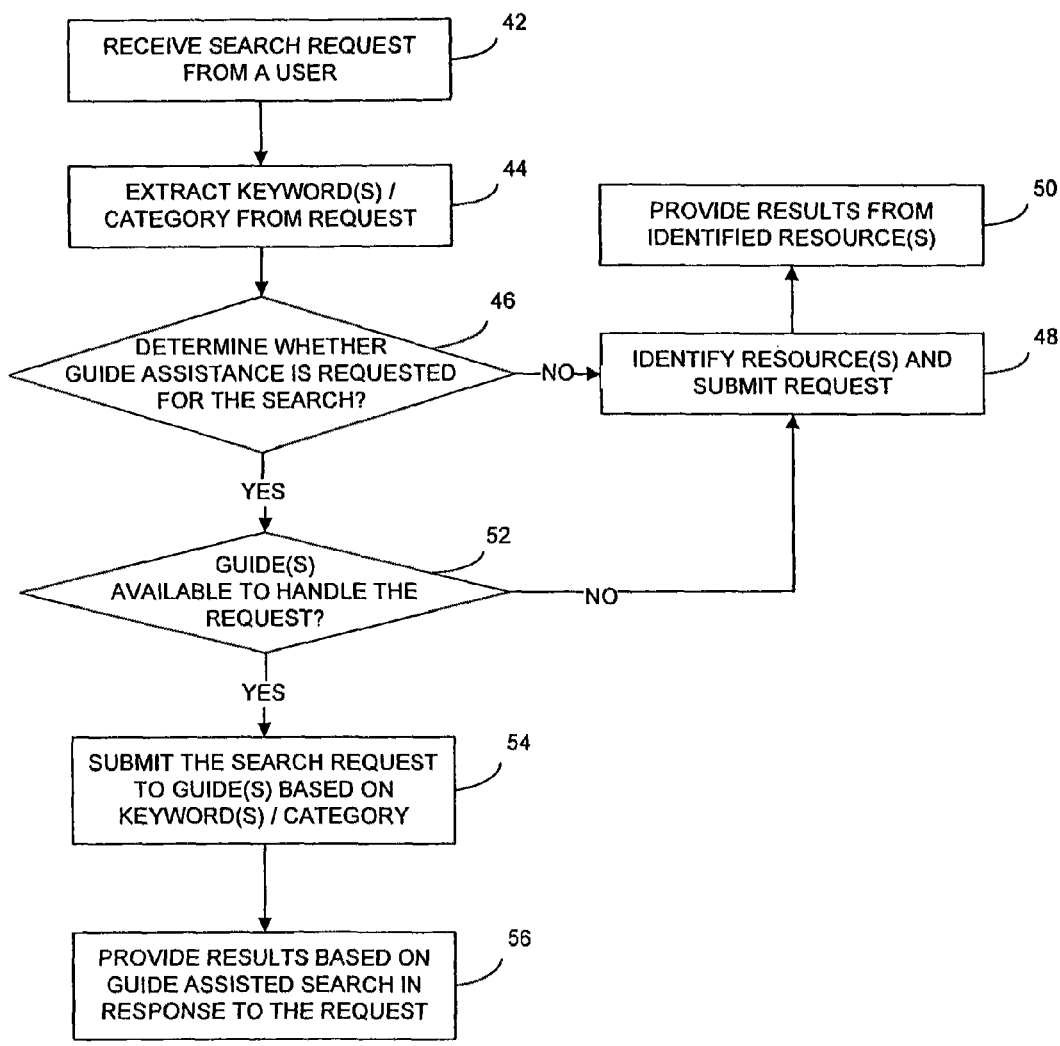
FIG. 3 is a flowchart for handling a request.

An exemplary process 40 providing an option of using identified resource(s) for a search is illustrated in FIG. 3. As shown in FIG. 3, process 40 begins by receiving 42 a request from a user. As previously discussed, a request may be any type of inquiry or keyword(s) pertaining to which a user is seeking information. For example, a user may submit a request regarding the show time and location of a movie within a particular zip code, information pertaining to a medical illness, or any other type of query.

Using the request from the user, process 40 moves to extracting 44 keyword(s) and/or a category from the request. Next, process 40 moves to determining 46 whether guide assistance is requested for handling the search or request. For example, a user may be inexperienced in the subject matter of the request, unable to locate relevant information, under a time constraint, etc., and may want a guide to conduct a search. On the other hand, a user may be an experienced searcher, may have a desire to review results from the best resource(s) for locating information of a particular subject matter, or may want to conduct a search without guide assistance due to the nature of the query, or for any other reason. If it is determined that guide assistance is not desired, process 40 moves to identifying 48 resource(s) to be used for submission of the request for a search to be conducted without guide assistance. When such a search is conducted, process 40 ends by providing 50 the search results to the user.

If it was determined 46 that guide assisted search was selected, process 40 continues by determining 52 availability of guide(s) to handle the search request. The determination of whether guide(s) are available includes determining whether any of the guide(s) registered for the identified keyword(s)/category with the system 20 (FIG. 1) are currently available to handle requests. For example, when a search request relates to the category "literature", determining guide availability 52 includes checking whether there are any guide(s) registered for handling requests for the category "literature" are able to conduct the search request. However, determination of guide availability 52 is not limited to any particular criteria, for example, any factor for verifying availability of a provider may be used.

When determining 52 that there are no available guides, process 40 continues to identifying 48 resource(s) to be used for submission of the request. For example, resources such as WebMD.com, NIH.com, etc., may be identified as resources for requests pertaining to the category "health", while ESPN.com®, NBA.com®, etc., may be identified as resources for requests pertaining to the category "basketball." However, the resources are not limited to any particular type of resources and may include Internet directories, meta search engines, information accumulated by guide(s) pertaining to any category or keyword and any other source that may be utilized for obtaining information. Determination of default resource(s) is explained in detail below with respect to FIG. 9.

Identifying 48 resource(s) may include determining resources most frequently used by guide(s) for seeking information related to a particular category or keyword. For example, when a significant number of guide(s) registered to handle requests pertaining to the category "health" utilize the web site NIH.com as a resource for seeking information, the NIH.com site may be provided as a default resource when a request pertaining to the category "health" is received. Identifying 48 resource(s) may also include determining resource(s) selected by guides, for example, based on prior success using a particular resource, speed and/or quality of results returned from a resource, or any other factor that may have contributed to increasing quality and experience of searches for guides. The identified 48 resource(s) may be modified as needed, for example, as the guides' experience develops.

When a user requests guide assistance, process 40 submits 54 the search request to guide(s), e.g., as disclosed in U.S. patent application Ser. No. 11/336,928. As described above with respect to FIG. 1, requests from the user devices 22 may be transmitted from a typical desktop or laptop system, a handheld computer such as a personal digital assistant (PDA), a basic cellular telephone, a text-enabled cellular telephone, a specialized query terminal, or any other source that allows a user to enter a query via text or speech entry. (Note: the words "speech" and "voice" are used interchangeably in this discussion). Information may be exchanged via communication systems including packet switched facilities, such as the Internet, circuit switched facilities, such as the public switched telephone network, radio based facilities, such as a wireless network, etc.

Figure 11:
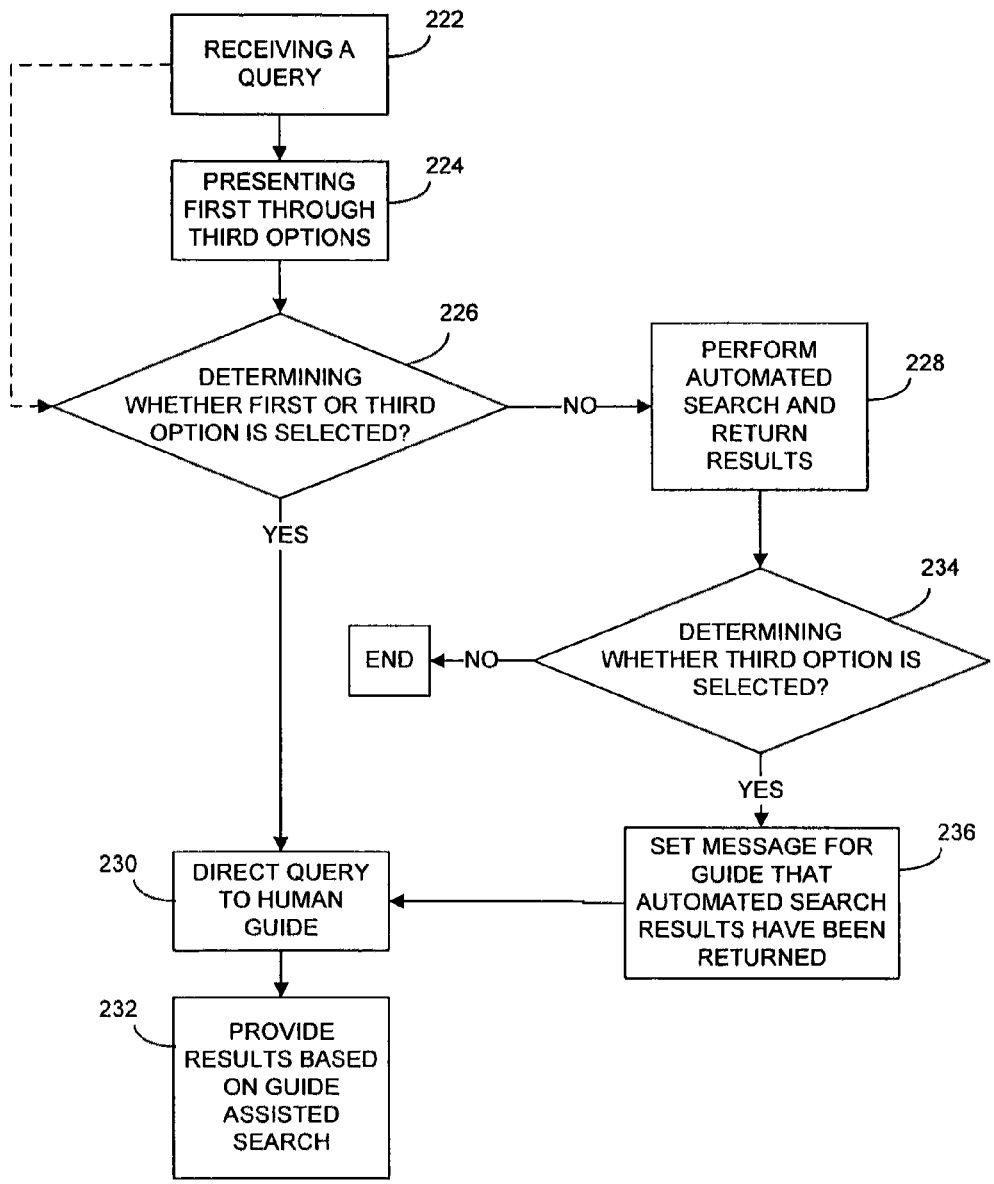
FIG. 11 is a flowchart for handling a query.

The search request is delivered to one or more guides via the guide systems 34 (FIG. 1). Submitting 54 the search request to guide(s) includes transmitting the search request to one or more guide systems 34. In a case where a user chooses a combination of submitting a request to the guide(s) and conducting a search without guide assistance and automated results have been provided to the user, the guide(s) may be provided with a message indicating that the automated results have been provided to the user (FIG. 11). Process 40 completes a guide-assisted search by providing 56 results from the guide(s) in response to the request.

Figure 4:
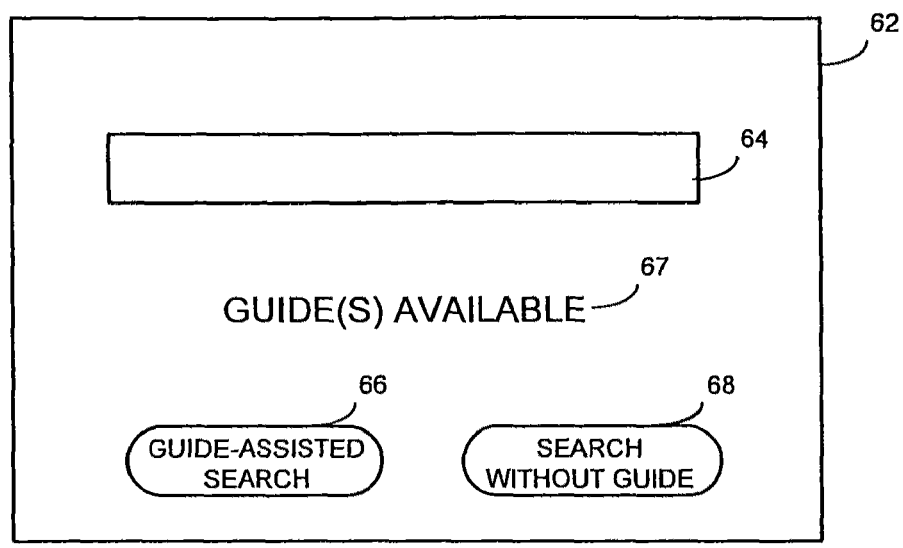
FIG. 4 is an exemplary graphical user interface providing an option for initiating a search without guide assistance.

An exemplary embodiment of a graphical user interface (GUI) 60 providing an option for submitting a request without guide assistance is illustrated in FIG. 4. As shown in FIG. 4, a query screen 62 is displayed to a user or information seeker who has a need to locate information. The query screen 62 includes search query entry field 64 enabling input of a request identifying information sought by the user, which may be a keyword, query, a fully-formed question, sentence, etc.

The query screen 62 may include a first button or widget 66 for triggering a guide-assisted search and a second button or widget 68 for selecting a search without a guide. While buttons 66 and 68 are shown as push buttons in FIG. 4, any type of user interface for providing an option for submitting a guide assisted search request or selecting a search without guide assistance may be used. For example, the GUI 60 may include a drop-down menu, an icon providing a single selection control, a pair of radio buttons and a search button, or the like, for selecting a search with or without a guide. As mentioned above, a user or an information seeker may want to conduct a search without a guide for a variety of reasons including privacy concerns, search experience, expertise in a particular field, etc., or any other reason that may cause the user to believe guide assistance is unnecessary or undesired.

When button 68 is selected, the system 20 (FIG. 1) forwards the query to the resource(s) identified 48 by process 40 (FIG. 3). The resource(s) may include resource(s) currently most popular among guide(s) associated with category or keyword of the request, top resources selected by guide(s), resource(s) defined for each category by the system administrator(s), etc. As such, results may be directly returned to the user without any assistance from a guide using resource(s) identified 48 based on the request, including resource(s) previously selected by human guide(s) who may be able to better evaluate resources that return relevant results than the InfoSeeker™. The resources used to supply results to a user opting to conduct a search without guide assistance are preferably selected based on keyword(s), category, or subject matter of the request. For example, a weighting may be attached to a keyword for determining how influential the keyword is within a request string with respect to other text in the request and resource(s) associated with the weighted keyword(s) may be used in conducting a search without a guide. The system 20 (FIG. 1) may also be configured to disregard commonly used words ("stop words") such as "the", "a", "of", etc., that appear in a query string when submitting the query to resource(s) for a search and/or obtaining results in response to the search.

Alternatively, when button 68 is selected, the system 20 (FIG. 1) may retrieve responses previously returned in response to requests from the database 28 and present the responses to a user opting to search without a guide. For example, previous responses addressing a query directed to a category or keyword query similar to that of the user's query may be obtained from the database 28 (FIG. 1) and automatically returned to the user without assistance from a guide. The previous responses may be presented one at a time in a rank order, for example, based on relevancy, or all stored responses pertaining to a category or keyword matching the user's query may be presented at one time. The system 20 (FIG. 1) may also limit the number of stored responses returned to a user opting to search without a guide. However, the present invention is not limited to any particular criteria of providing results to users opting to search without a guide. For example, a user may be presented with a list of previous responses stored in the database 28 (FIG. 1) including data related to the responses such as create date/time, identity of guide(s) generating the responses, rating, etc., grouped by category, thereby allowing the user (InfoSeeker™) to select response(s) relevant to the user's query from the list.

When a user selects the button 66 triggering a guide-assisted search, the server 26 (FIG. 1) passes the request to guide system(s) 34 to produce search results. Assigning the request to one or more of available guide(s) may be implemented in various ways including as discussed in U.S. patent application Ser. No. 11/336,928, including but not limited to determining which guides or searchers are available to search for the information being requested, based upon factors such as the guides being logged in, searchers who are signed up for a keyword, or category, or the ranking of the guide based on previous performance. The query screen 62 may further includes an indicator 67 advising a user as to whether guide(s) are available. The GUI 60 may also provide information pertaining to the number of guides currently online, the number of online guides that are in an interactive search session with a user, etc.

Figure 5:
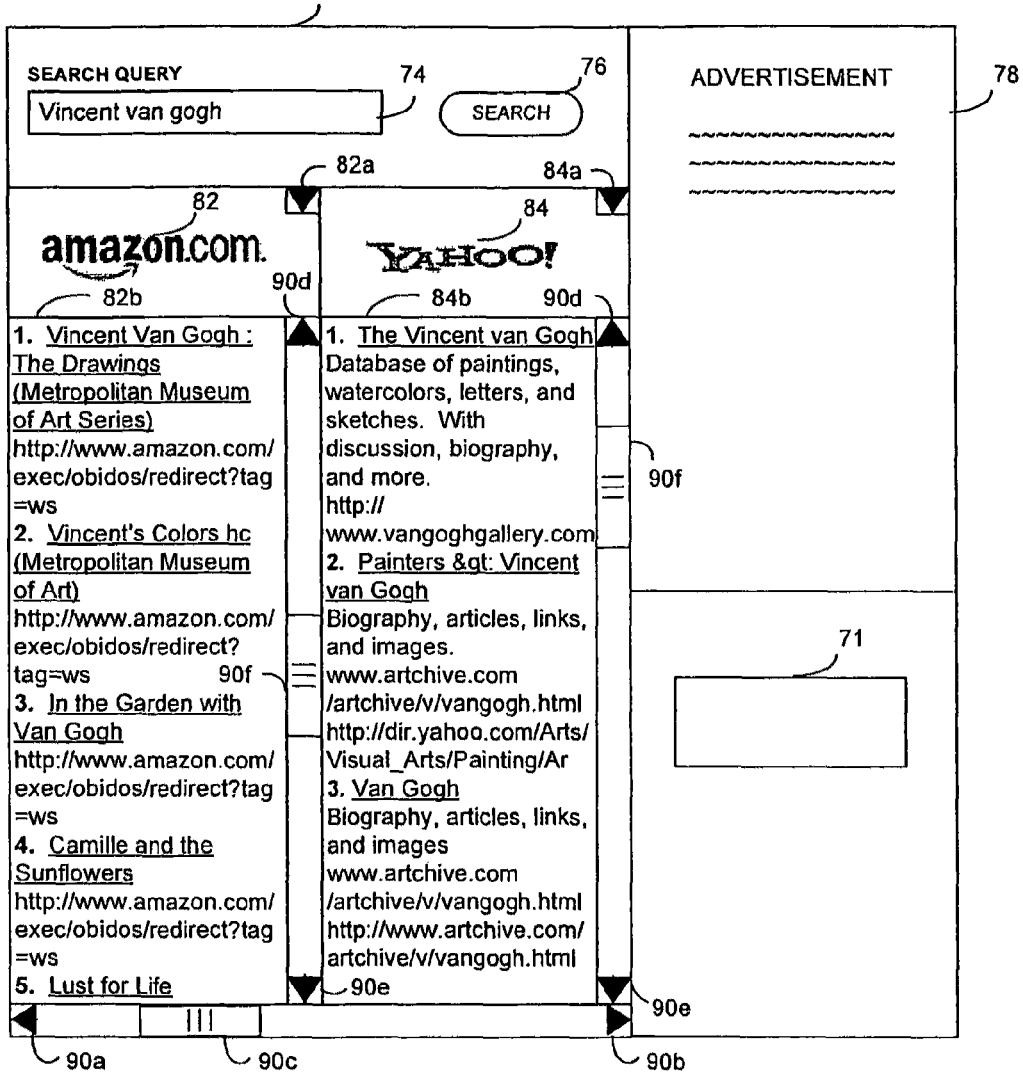
FIG. 5 is an exemplary screen shot of a window displaying resource(s) used for a search without guide assistance.

FIG. 5 illustrates a GUI 70 for providing results from resources used in response to a search request without a guide. As shown in FIG. 5, the GUI 70 includes window 72, search query entry field 74 and search button 76. The window 72 includes results 82b and 84b returned for a search conducted for the request in the search query entry field 74 using resources 82 and 84, respectively. For example, results 82b are returned from Amazon.com® (resource 82) and results 84b are returned from Yahoo.com® (resource 84) based on a search conducted for a request pertaining to Vincent Van Gogh when the user opted to conduct a search without guide assistance by selecting button 68 (FIG. 4). While resources 82 and 84 are provided in FIG. 5, the claimed invention is not limited to supplying any particular type or number of resources for conducting a search without a guide. For example, three or more top resource(s) used for searches by guide(s) associated with a category may be provided to a user opting to conduct a search without guide assistance.

Resources utilized for obtaining results in response to a search request without a guide may be modified using a button 71. For example, a user opting to search without assistance from a guide may choose to execute the search using resource(s) with which the user is most familiar with in addition to resource(s) most frequency used by guides associated with a category related to a query submitted by the user. Although modification of resource(s) is discussed with respect to the button 71, other interfaces such as menu options, etc., may be utilized to enable a user to configure a resource to be used for searching without a guide.

Information content of resources 82 and 84 are displayed using renderer windows embedded within the window 72. The information from the resources 82 and 84 may include text, images, links, videos, HTML, XML, XHTML, cascading style sheets, Java Script, etc., or other electronic data available over the Internet and/or from a local network. The window 72 may include N number of renderers representative of various resources used by guide(s) associated with a particular category or keyword for providing guide-selected resources of the category to a user who opts to conduct a search without guide assistance.

The window 72 includes GUI elements 90a, 90b, 90c, 90d, 90e, 90f for viewing contents displayed by each renderer of results from a resource. Specifically, GUI elements 90a and 90b enable scrolling from one side of a frame to another, GUI elements 90d and 90e enable scrolling up and down within a frame and GUI elements 90c and 90f provide quicker navigation through results from the resources. The GUI elements 90a through 90f may be similar to typical graphical user interfaces of application programs that provide navigational capabilities. However, the present invention is not limited to any particular navigation component for browsing through information displayed in frames whose contents are generated by renderer. For example, when information accumulated from the private database of a guide is provided via the window 72, browsing through the information may be via clicking on a link, selecting a checkbox, etc.

The renderers displayed in the window 72 refer to components including scripts, programs, browsers and Web servers involved with presenting contents of resources. The content delivered using the renderers may include HTML, DHTML, script code, etc., that was either dynamically generated by a Web Server, associated programs and/or server-side scripts. As mentioned above, the GUI elements 90 may be used for viewing contents displayed in the renderers including navigating through delimited areas (e.g., frames) within a browsers' presentation space that may have their own display characteristics, content, scripts and/or borders.

The window 72 may further include advertisement frame 78 displaying advertisement information, which in one embodiment includes guide selected real-time advertisements related to a category or keyword of a request submitted. For example, guide(s) may pre-select information of suppliers providing prints of Vincent Van Gogh paintings to be displayed in the advertisement frame 78 when a search directed to Van Gogh is requested. Information provided via the advertisement frame 78 may include video, music, games, web links, etc. that will interact with, and is preferably displayed to, the user while the search is being performed and continues after the search results are displayed. Alternatively, information provided in the advertisement frame 78 may be chosen by the server 26 (FIG. 1). For example, the server 26 may select information to be supplied to the advertisement frame 78 based on a time of day, an estimated time for completion of a search, etc.

Figure 6A:
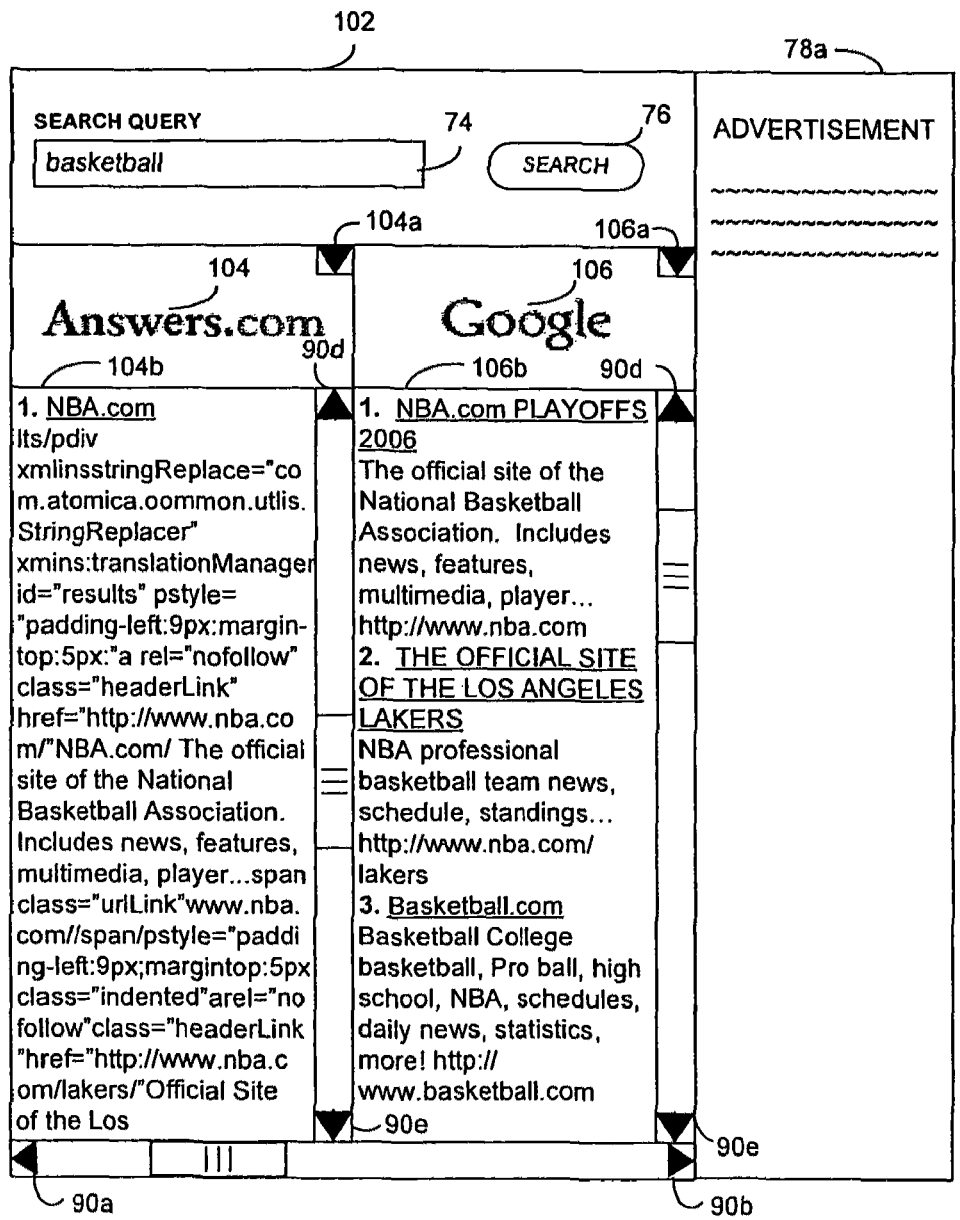
FIG. 6A is an exemplary display window providing resource(s) used for a search request without guide assistance.

As discussed above, FIG. 5 illustrates GUI 70 displaying resources used for a search request without a guide. When a search request of a different category or subject matter is submitted for conducting a search without a guide, GUI 100 shown in FIG. 6A may be provided for displaying results from resources. As shown in FIG. 6A, GUI 100 includes window 102 including a search button 76 for triggering a search and a search query entry field 74 containing a request pertaining to the category basketball. Similar to window 72 (FIG. 5), the window 102 includes results 104b and 106b returned for a search pertaining to basketball using resources 104 and 106, respectively. For example, results 104b are returned from Answers.com® (resource 104) and results 106b are returned from Google.com® (resource 106) based on a search conducted for a request directed to the category basketball.

The window 102 includes advertisement frame 78a displaying information including text, video, music, games, web links, etc. while a search for a request entered in the search query entry field 74 is being performed. Similar to the window 72 (FIG. 5), window 102 includes GUI elements 90a, 90b, 90c, 90d, 90e, 90f for viewing contents displayed within each renderer of information of a resource.

Figure 6B:
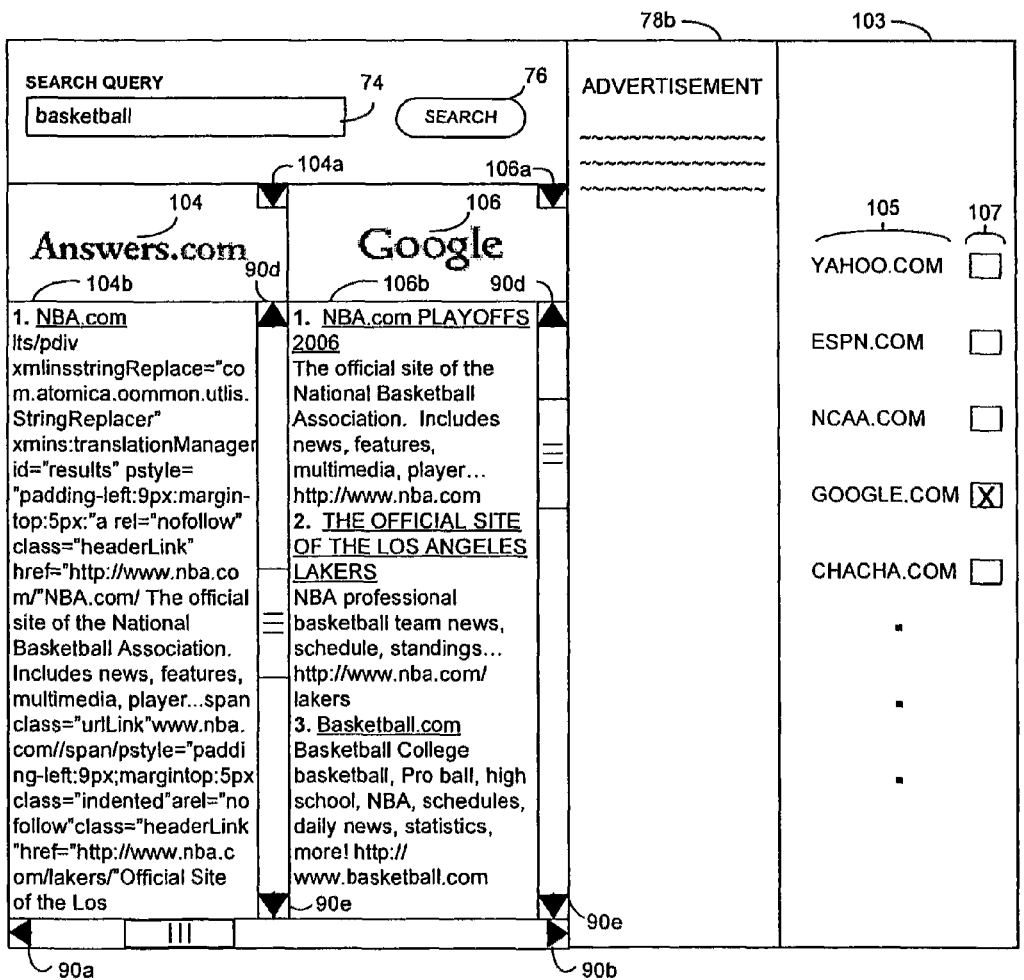
FIG. 6B is an exemplary display window for modifying resource(s) used for a search request without guide assistance.

The GUI 70 shown in FIG. 5 enables a user to modify resources to be used for a search using the button 71, GUI 101 in FIG. 6B presents a list of resources 105 in a resource pain 103 that may be chosen to pass the query in search query entry field 74 to selected resource(s) including internal or "in-house" resources such as a privately indexed set of data or search results from previous searches. One or more of the listed resources 105 may be selected by placing a checkmark in a corresponding one of the checkboxes 107 next to the resource and may be de-selected by removing a checkmark next to a resource indicated as being selected. For example, a user opting to search without assistance of guide(s) or a guide assisting a user with a search may select additional resource(s) from the list of resources 105 to get results in addition to the results 1 04b and 106b using the additional resources selected. Accordingly, a user or guide, depending on who is executing a search, may select resource(s) from the list of resources 105 and cause a query to be sent to the selected resource(s) in real-time at the user's or guide's control. Alternatively, resources 105 may be clicked on individually for a one-time use rather than checking the checkboxes 107. In this mode, the query text may be sent to the resource for a one-time look-up of results from that resource. This has the benefit of not having to constantly update resources.

Figure 7A:
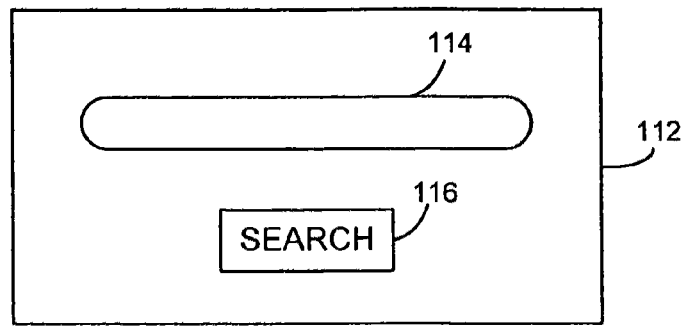
FIGS. 7A and 7B are exemplary interfaces for providing preliminary results while a guide-assisted search is executed and access to unassisted search results.
Figure 7B:
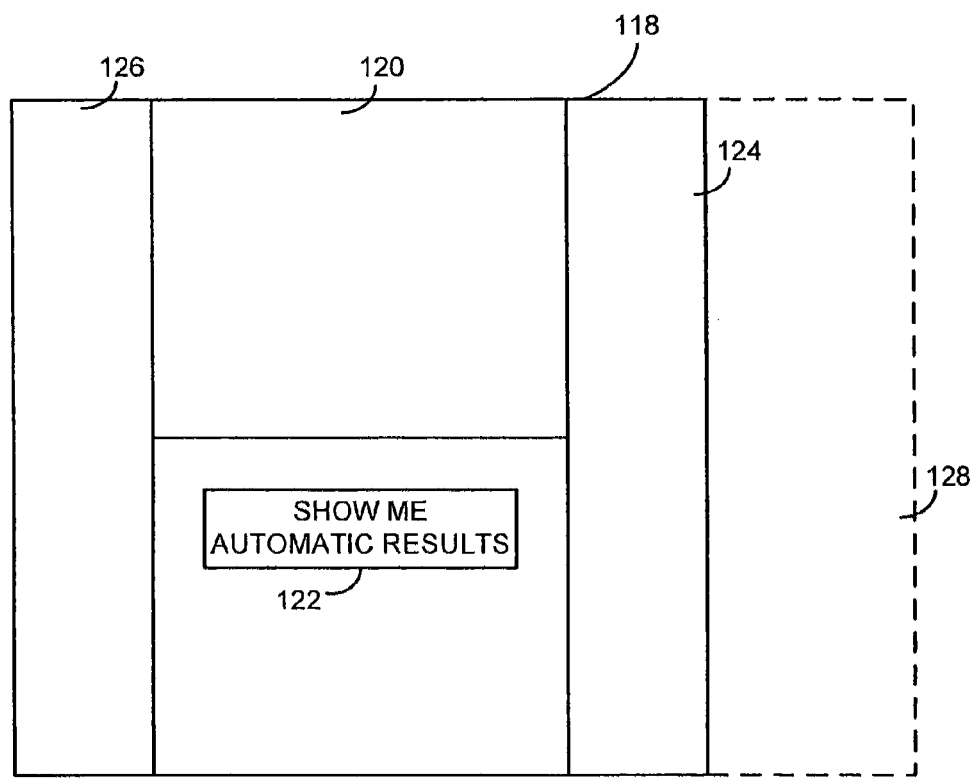

As an alternate embodiment of the GUI 60 illustrated in FIG. 4, FIGS. 7A and 7B illustrate a search interface 110 for providing preliminary results while conducting a guide-assisted search and access to unassisted search result(s) according to another disclosed embodiment. As shown in FIG. 7A, the search interface 110 includes a query screen 112 providing a search query box 114 for entering a request and a search button 116 for initiating a guide-assisted search for the request in the search query box 114.

When the search button 116 is selected, the search interface 110 displays window 118 illustrated in FIG. 7B. The window 118 includes a chat window 126 enabling instant messaging capability for conducting a chat with a guide while the search is being performed. Instant messaging or chat session capability provided via the chat window 126 may be provided via VOIP or any other technology enabling instant interaction and may be used to indicate progress of the search being performed. The window 118 further includes an advertisement window 124 providing advertisements selected in relation to a request in the search query box 114, or any advertisement supplied by the server 26 (FIG. 1). The advertisement window 124 may contain text, images (e.g., JPEG, GIF, etc.), a video, an applet, links, multimedia objects implemented using Flash, Java, etc. The contents of the advertisement window 124 may be selected in the same manner as described above with regard to FIGS. 5, 6A and 6B.

As shown in FIG. 7B, the window 118 includes a preliminary results window 120 displaying results produced by one or more guides performing a search for the request and an automatic results button 122 for displaying results automatically generated by an unassisted search, as described above. For example, when a guide-assisted search request is submitted and a guide begins performing a search in relation to the request, initial results obtained by the guide may be displayed in the preliminary results window 120. However, if the Info-Seeker™ is impatient and preliminary results are not being displayed quickly enough, the automatic results button 122 may be selected to display results of an unassisted search.

The window 118 may provide the unassisted (automatic) search results in the preliminary results window 120 integrated with the preliminary results or in a separate window, such as those illustrated in FIGS. 5, 6A and 6B. For example, both preliminary results returned from a guide and automatic results from one resource at a time could be displayed by adding frame 128. In any of these alternatives, the user is provided with preliminary results from guide(s) and automatic results and may choose to review any of these the results while the guide(s) continue to perform the search. The window 120 may also be used to display automatically provided search results while the guide is building the guide-assisted or "deep web" search results.

Typically, the frame 128 may include links that look similar to those of current search engines. Alternatively, actual text, graphics, audio, video, or other information files may be displayed in the frame 128 by a searcher dragging and dropping such files to the results frame, similar to what is accomplished with operating systems such as Windows where files may be copied by dragging and dropping to another location.

The results of the unassisted search in response to selection of the automatic results button 122 (FIG. 7B) may be algorithmically-selected and/or produced using human-selected resources (or results). Further, subsequent to being presented with automated results, the user (InfoSeeker™) may choose to execute a guide-assisted search. An interface for presenting automated results with an option for conducting a guide-assisted search is explained in further detail below with respect to FIGS. 7C and 7D.

Figure 7C:
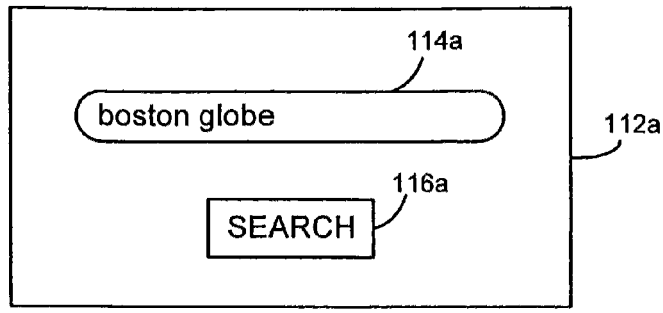
FIGS. 7C and 7D are exemplary interfaces for providing search results.

As shown in FIG. 7C, the search interface 110a includes a query screen 112a providing a search query box 114a for entering a request and a search button 116a for initiating a search pertaining to the request in the search query box 114a. For example, in some cases, it may be desirable for the user (InfoSeeker™) to execute an automated search using algorithmically-selected and/or human-selected resources (or results) in lieu of or prior to a human-assisted interactive search. In this case, the system 20 (FIG. 1) may provide the search interface 112a shown in FIG. 7C which may be similar to a conventional search query window, and the option to select a human-assisted search for a query may be offered after an automated search on the query has been performed.

Figure 7D:

When the search button 116a in FIG. 7C is selected to conduct a search related to the request in the search query box 114a, the search interface 110a displays window 113 illustrated in FIG. 7D. The window 113 shown in FIG. 7D includes a query box 114b, a search button 115, a search with guide button 117 and results 119. The query entered in the search query box 114a may be displayed in the query box 114b in the window 113 along with results 119. Subsequent to viewing the results 119, the user may modify the query in the query box 114b and select the search button 115 for an unassisted search or submit the query to trigger a guide-assisted search via the search with guide button 117.

Figure 8:
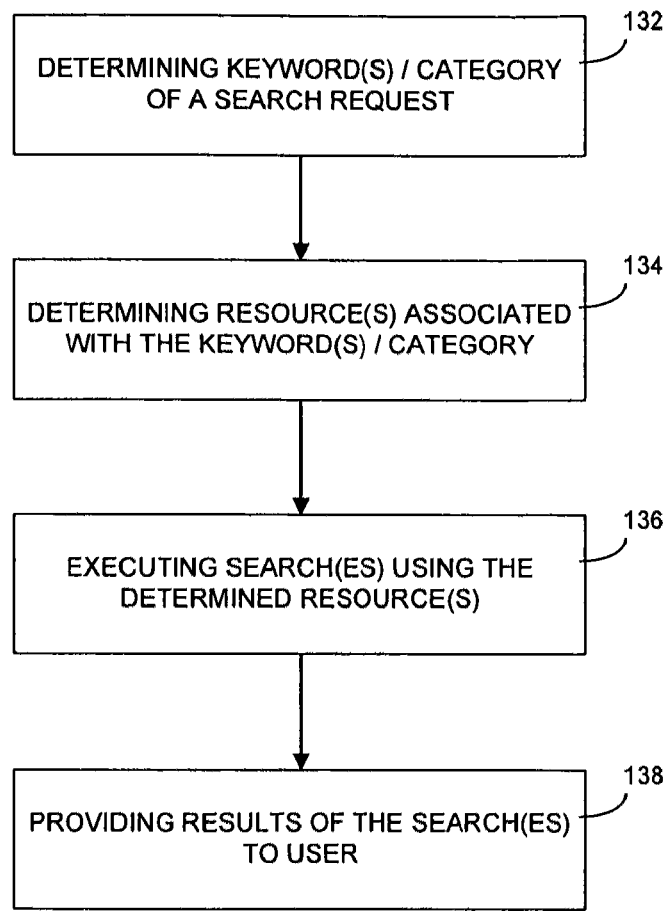
FIG. 8 is a flow diagram illustrating determination of resource(s) for a search request without guide assistance.

An exemplary process 130 for determining resource(s) and performing a search is illustrated in FIG. 8. As shown in FIG. 8, process 130 begins by determining keyword(s)/category 132 of a search request. For example, a search request pertaining to "Michael Jordan" may be determined to be related to the category "basketball" while a search request pertaining to "diabetes" may be determined to be related to the category "health" or the keyword "diabetes" if defined. As previously discussed, a request may be any type of inquiry or keyword(s) pertaining to which a user is seeking information. When a request is a sentence, the system 20 (FIG. 1) may determine strength of words contained in the sentence and determine category 132 of the "strongest" word. For example, the last name "Jordan" may be weighted higher than the first name "Michael" for determining the category of the search request pertaining to "Michael Jordan."

Subsequent to determining category 132 of the search request, process 130 moves to determining resource(s) 134 associated with the category. Determination of resource(s) 134 for a category may include ranking all resource(s) utilized by guide(s) of a particular category and determining the top three resources as resources of that particular category. For example, resources such as the web sites WebMD.com, NIH.com, CDC.gov may be the top three most used resources used for conducting searches pertaining to the category health and thus, may be designated as resources associated with the category health for unassisted searches. Similarly, the sites ESPN.com®, NBA.com®, NCAA.com may be the top three most used resources for requests pertaining to the category basketball and thus, may be designated as resources associated with the category basketball for unassisted searches.

Subsequent to determining resource(s) 134 associated with the keyword(s)/category, process 130 continues by executing 136 a search via the determined resources. Using the same example discussed above, the request pertaining to health is submitted to search tools at the sites WebMD.com, NIH.com, CDC.gov and the request pertaining to basketball is submitted to the sites ESPN.com®, NBA.com®, NCAA.com.

When results are obtained by executing the search 136, process 130 moves to providing results 138 of the search to the user. As illustrated in FIGS. 5 and 6, results returned for each resource may be rendered in a corresponding frame. For example, for the request pertaining to the category health discussed above, a renderer is provided for displaying each of the results returned from the sites WebMD.com, NIH.com and CDC.gov, and similarly, renderers are provided for displaying the results returned from the sites ESPN.com®, NBA.com®, NCAA.com, respectively, for the request pertaining to the category "basketball."

Figure 8A:
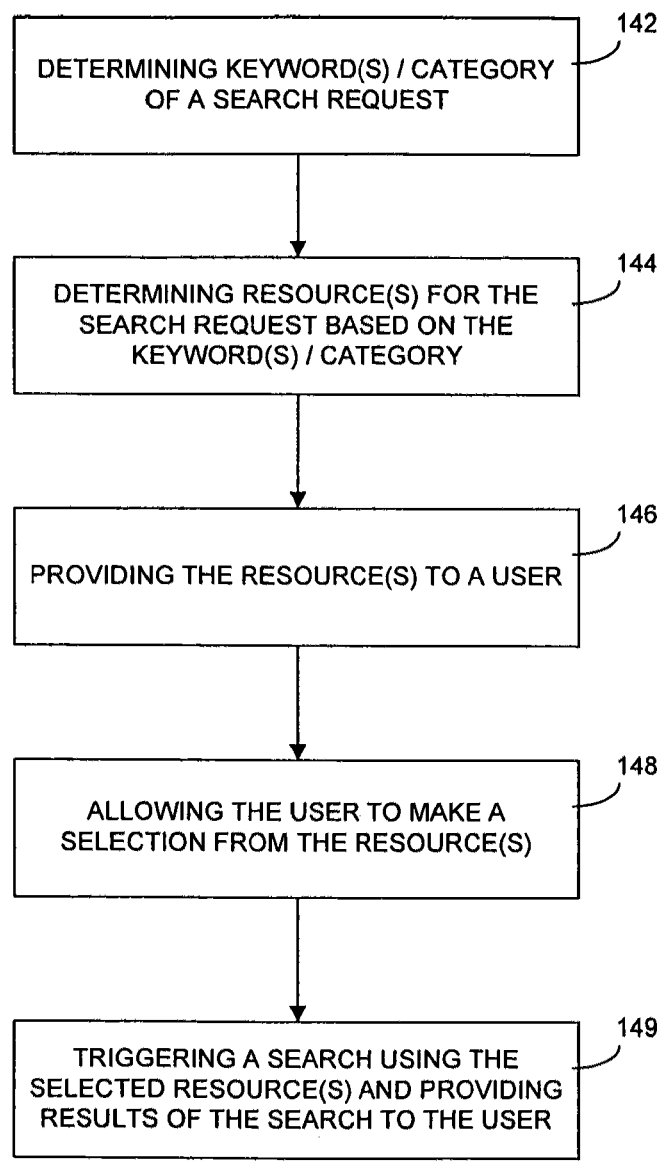
FIG. 8A is a flow diagram illustrating providing resource(s) for a search request without guide assistance.

An exemplary process 140 for providing resource(s) to a user is illustrated in FIG. 8A. As shown in FIG. 8A, process 140 begins by determining keyword(s)/category 142 of a search request. For example, a search request pertaining to "Dikembe Mutombo" may be determined to be related to the category "basketball" and/or charitable organizations. As discussed above, determination of keyword(s)/category 142 may be based on keyword(s)/category determination of previous search requests having a similar content, strength of a keyword in the request, etc.

Subsequent to determining keyword(s)/category 142 of the search request, process 140 moves to determining resource(s) 144 for the search request based on the keyword(s)/category. For example, resources such as search engines, Internet directories, web sites, etc., frequently used by guides handling searches pertaining to the keyword(s)/category may be determined as resource(s) for the search request.

Subsequent to determining resource(s) 144 for the search request, process 140 continues by providing 146 the resource (s) to a user. Using the same example discussed above, a user submitting the search request or a guide handling the search request may be provided with search engines, Internet directories, web sites, etc., that are determined to be relevant for the search request. After providing 146 the resource(s) to the user, process 140 allows the user to make a selection 148 from the resource(s). For example, the user submitting the search request may be provided with a list of web sites that are deemed relevant for the keyword(s)/category pertaining to the search request from which the user can select to use for a search.

When a selection 148 is made from the resource(s) provided, process 140 moves to triggering 149 a search using the selected resource(s) and providing results of the search to the user. For example, a search may be conducted using NBA.com® and ESPN.com® when the request relates to the keyword "basketball" based on the selection of the user from various other resources provided as being relevant for the request.

Figure 9:
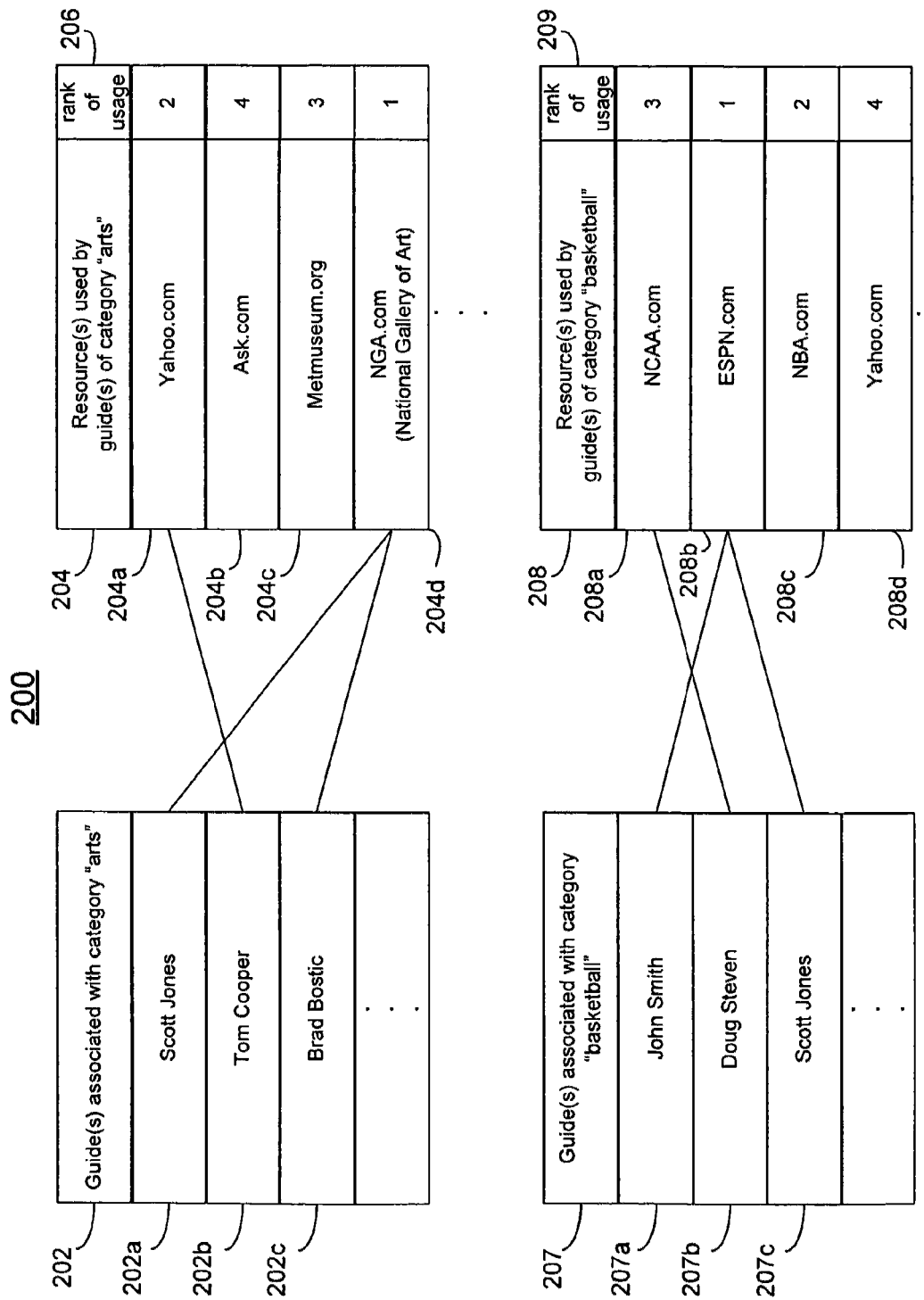
FIG. 9 is a table relationship diagram illustrating correlation between categories and resources.

FIG. 9 is a simplified example of a table relationship 200 illustrating correlation between categories and resources used for the categories. As shown in FIG. 9, the table relationship 200 includes correlation of resource(s) 204 used by guide(s) 202 of the category "arts" for conducting searches with guide (s) 202 associated with the category "arts." For example, guides 202a and 202c, respectively, use resource 204d (NGA.com) while guide 202b uses resource 204a (Yahoo.com®) for conducting searches pertaining to the category "arts." Similarly, the table relationship 200 includes correlation of resource(s) used by guide(s) 208 of the category "basketball" for performing searches with guide(s) 207 associated with the category "basketball." Illustratively, guides 207a and 207c use resource 208b (ESPN.com) while guide 207b uses resource 208a (NCAA.com) for conducting searches pertaining to the category "basketball." While specific resources are mentioned in describing the table relationship 200, a guide should not be construed to being limited to use of any particular resource. While FIG. 9 shows only three specific guides for each category and indicates only one resource utilized by each guide, more or less guides may be associated with each category and each guide may use more than one resource for searches pertaining to the category with which he or she is associated.

The table relationship 200 includes rank of usage 206 of resource(s) used by guides of each category based on usage of the resource(s) for conducting searches in relation to each category. For example, of the resources used by guides 202 of the category "arts", resource 204*d* (NGA.com) ranks the highest while resource 204*b* (Ask.com®) ranks the lowest. On the other hand, from the resources used by guides 207 of the category "basketball", resource 208*b* (ESPN.com®) is ranked the highest while resource 208*b* (Yahoo.com®) is ranked the lowest. The ranking of resources for a particular category may also be weighted based on other factors such as use of a resource by a highly experienced guide, quality of a resource in returning relevant results, etc.

Figure 10:
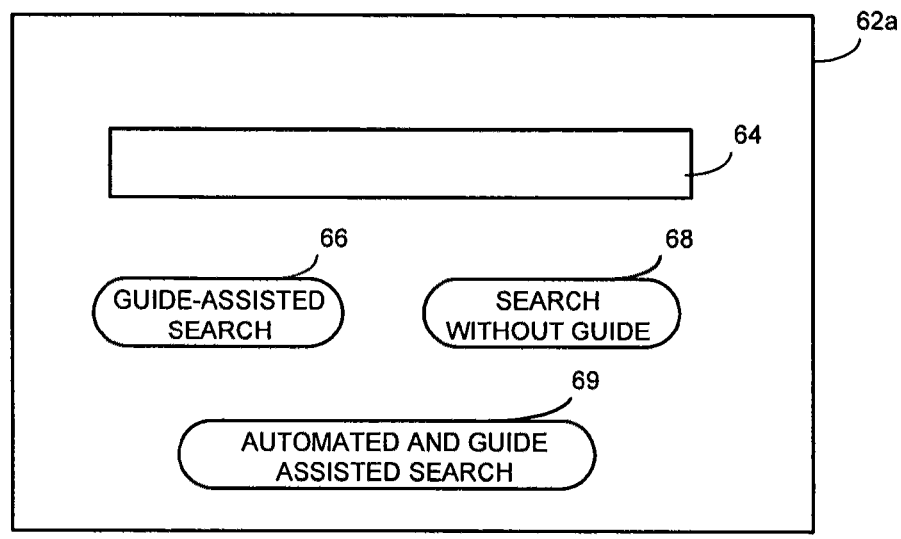
FIG. 10 is an exemplary graphical user interface providing an option for automated and guide assisted search.

An exemplary embodiment of a GUI 210 providing an option for automated and guide assisted search is illustrated in FIG. 10. The GUI 60 shown in FIG. 4 provides button or control 66 for triggering a guide-assisted search and button 68 for selecting a search without a guide. As shown in FIG. 10, the GUI 210 includes a query screen 62*a* having the query box 64 and buttons 66, 68 and 69. Similar to GUI 62, buttons 66 and 68 of the query screen 62*a* initiate a guide-assisted search and a search without a guide, respectively. On the other hand, button or control 69 provides an option of an automated and guide assisted search. For example, when a user selects button 69, a query is submitted to a search engine where the user would get back "instant" results and the query is submitted to guide(s) for returning "deep web" results to the user after a period of time. This, for example, enables the user to benefit from both fast results and "deep web" results produced as a result of assistance from guide(s).

An exemplary process 220 for handling a query is illustrated in FIG. 11. As shown in FIG. 11, process 220 begins by receiving 222 a request for initiating a search. As previously discussed, a request may be any type of inquiry or keyword(s) pertaining to which a user is seeking information such as a query regarding show time/location of a movie, a medical illness, etc.

Upon receipt 222 of the query, process 220 moves to presenting 224 first through third options for processing the query. The first through third options presented 224 provide a choice between submitting a request to human search guide(s), conducting a search without guide assistance or a combination of both. For example, a first option may be initiating a search without guide assistance, a second option may be initiating a guide assisted search and a third option may be a combination of initiating a search without guide assistance and a guide assisted search.

Of course, if the interface of FIG. 10 is used and the user has submitted the query with one of the buttons activated, then presentation of the first through the third option has already occurred and the process 220 would proceed directly to determining 226 whether the first through the third options were selected as shown by the dashed line.

In situations when the interface of FIG. 10 is not used, process 220 moves to determining 226 whether first or third option is selected following the presentation 224 of options. Specifically, upon presenting 224 first through third options, process 220 determines 226 whether a search without guide assistance or a combination of a search without guide assistance and with a guide is selected. For example, a user under a time constraint may want to initiate a search without a guide such that the search engines conduct the search and at the same time may initiate a guide assisted search submitting the search to the guide while the user conducts the search.

Upon determining 226 that the first or third option is selected, process 220 moves to performing 228 automated search and returning results. Using the same example of the user having a limited time for a search, when the user selects the first option for initiating a search without a guide or the third option for initiating a combination of a search without a guide and with a guide, the user will be "instantly" presented with automated results. Subsequent to performing 228 automated search and returning results, process 220 determines whether the third option is selected 234. When it is determined that the third option is selected 234, process 220 sets 236 a message for a guide that automated search results have been returned and directs 230 the query to the guide. However, when it is determined that the third option was not selected, process 220 terminates and the system awaits further user input which may include submission of a new search request. However, when the user has selected the third option, the user is presented with automated results and further the query is directed to a guide, for example, while the user is reviewing the automated results.

Of course, when button 69 (FIG. 10) is selected, the query can be submitted in parallel to both the search engines and the guide.

On the other hand, upon determining 226 that the first or third option is not selected, process 220 moves to directing 230 the query to a human guide. For example, when the query received pertains to the category "world cup soccer 2006", process 220 determines which of the guides registered to the system 20 (FIG. 1) have registered to handle requests pertaining to the same or a similar category and directs the query to one or more of the guides. However, any criteria discussed in U.S. patent application Ser. No. 11/336,928 for matching guide(s) to a query submitted by a user may be used to direct the query to the guide(s) including but not limited to keyword(s) for which a guide has registered, prior successful searching by the guide (for this specific keyword and/or in general), speed of producing search results for users during past searches, and other factors that help to provide a quality search and experience for the user, proximity of the guide to location from which the request originated, etc.

Subsequent to directing 230 the query to the human guide, process 220 moves to providing 232 results based on guide assisted search. For example, the guide may utilize one or more existing search engines, obtain information from results returned from the search engine(s) and provide the obtained information as a response to the query.

Thus far, the interface has been described in a manner that assumes that the user or information seeker accesses the system via a user device that is browser enabled, however the described system and method may utilize other interfaces within the scope of the disclosure. For instance when the user accesses the system via a non-web enabled user device, such as via a telephonic device, two way radio or any other communication device that allows the user to talk over a distance, a voice and/or DTFM interface may be utilized to present the query and to select whether the search is to be conducted with or without the assistance of a guide.

The oral speech queries presented by a user or information searcher utilizing a telephone or other voice communication device as the user device 22 may be stored in the system database 28 and converted into digital text queries by a speech translation system either implemented by server 26 or some separate server. Alternatively, the information seeker's user device 22 may perform this processing. The speech translation system translates the speech into text, possibly by interaction with other systems, or it may perform the task locally. A human or automated operator implemented by the server 26 or some separate device can receive the communication containing the query from the user and present options to have the search conducted of the query with or without the assistance of a guide. Speech to text conversion may be performed by using either speech transcription using human transcribers or using conventional speech-to-text processing, also known as automatic speech recognition (ASR). The speech queries can originate from a user's telephone and can be handled initially via automated attendant speech prompt type processing (or alternatively, via an interactive speech response or IVR system) to obtain the user's query.

The speech translation server implemented by the server 26 or as a separate device keeps track of the port from which the call originated and assigns a user identifier to the user on this port for a particular session. The system can prompt the user to speak the query. The speech queries can also originate from another source called a "speech query service requester" (SQSR) rather than directly from the user, such as a private or public information provider. For example, a speech query can be initially processed by a public library telephone system and switched to the server. The speech query may physically arrive at the system via a variety of input means, including time-division multiplexed lines, voice over IP (VOIP) packets from an Internet connection, and other sources. The speech query may arrive as a stream or packet or series of packets.

The SQSR may communicate with the speech translation server via a variety of mechanisms including an IP-based socket address or via a Microsoft NET service, making the translation services of widely available via the Internet to any application that wishes to use them.

The packet can then be processed locally at the speech translation server to convert it from digitized speech into text or, alternatively, it may be processed by a remote system. If the digitized speech is being transcribed by human transcribers, this can be accomplished by sending the digitized speech to one or more transcriber systems where human transcribers can hear the speech, for example via headphones or speakers, and transcribe the information by typing the text into their system, so that the text is then sent back to the speech translation server (or alternatively, directly to the query server or to the SQSR), all within a matter of seconds (preferably less than 10 seconds after the user has finished speaking the query). To speed up processing, the speech query can be and typically is preferably broken up into a stream of packets and passed to the transcriber, without interruption, as it is being spoken by the user, thereby allowing for reduced latency in the system. Preferably, there are many more transcribers available in the system than there are instantaneous queries so that delays are not induced into the system. In the case of an overflow of queries, a form of flow control may be utilized by telling some callers that they must hold on the line for an available transcriber (which might be described to the caller as holding for an operator or agent). Preferably, the speech translation server maintains a database of all transcribers that are currently logged-in and available to perform the service of transcription using a transcription software application on their transcription system. Alternatively, this function of tracking the availability of transcribers might be located on a remote system and/or might be implemented using a distributed mechanism among transcriber systems (for example, using P2P mechanisms).

The speech translation server may feed continuous sequential speech phrases from various and different sources (e.g. users) to any given transcriber. Hence, the transcriber is sequentially transcribing, in rapid succession, speech messages from various speakers and creating separate text packets that are associated with each speech message.

Once the query is in digital text form, it is provided to the query server. The text entry features of cellular telephones can also be used to enter a query in digital text form allowing users to submit queries textually from telephones.

When a user accesses the search system utilizing a voice device, in one embodiment the interface is an automated operator presenting an audio script that may include an introductory phrase indicating that the user has reached the search system. The automated operator will the present a phrase requesting that the user state their query in order to receive 222 the query. In one embodiment, a speech-to-text engine may convert the spoken query to digital text to form a digital text version of the query. A text-to-speech engine converts the digital text version of the query to a confirmation audio version of the digital text version of the query. The automated operator will then present the audio version of the digital text version of the query to the user and request that the user confirm that the audio version of the digital text version of the query conforms to the user's desired request. In one version the automated operator presents a script phrase to the user requesting that the user confirm that the audio version of the digital text version of the query conforms to the user's actual query by stating "yes" if the audio text version is correct or stating "no" if the audio version is incorrect. Alternatively, if the user has accessed the search service using a touch tone phone, the automated operator may request that the user press "1" on their phone if the audio text version is correct and press "2" if the audio version is incorrect. Other alternative methods of confirming that the user's query has been correctly been converted to a digital text version may also be utilized within the scope of the disclosure. If the user indicates that the digital text version of the query is incorrect, the automated operator may present the request to speak the query again and repeat the above described process. Alternatively, upon receiving an indication that the audio version of the digital text version of the query is incorrect the automated operator may transfer the call to a live operator or transcriber.

Upon receiving confirmation that the user's query has been correctly converted to a digital text version of the query the receiving 222 a query step is complete. The automated operator will present a script indicating that the search on the query may be conducted with the aid of a guide, without the aid of a guide, i.e using automatically generated results, or both automatically and with the aid of a guide in order to present 224 first through third options to the user. The automated operator will present a vocal menu indicating the available options and request that the user indicate their desired choice of search options. The indication of the desired search options may be made by the user providing a voice prompt conforming to a scripted menu of voice prompts which may be recognized by the AVR or by requesting that the user indicate their desired option choice by pressing specific buttons of their touch tone phone. The user's input is utilized to determine 226 whether the first or third option is selected. Once confirmation is received that the digital text version of the query is correct and the user's desired option for the manner in which the search is to be conducted is determined, searching is conducted in the manner described above and in the incorporated U.S. patent application Ser. Ser. No. 11/336, 928.

Figure 12A:
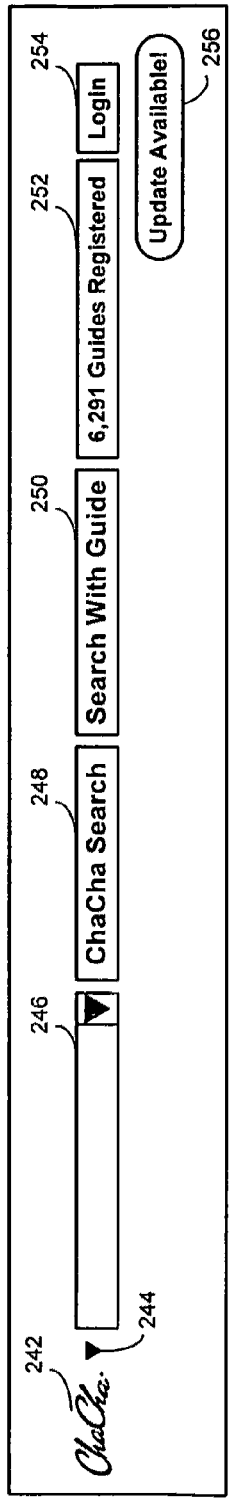
FIGS. 12A and 12B are exemplary interfaces for executing search related functions.
Figure 12B:
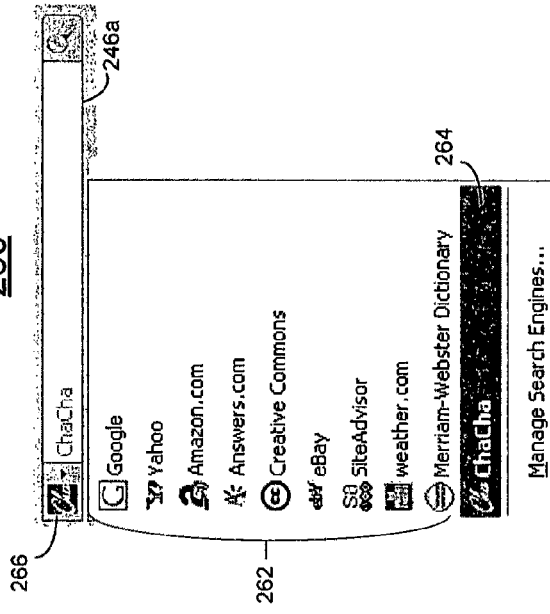

FIGS. 12A and 12B illustrate interfaces 240 and 260 for executing search related functions. As shown in FIG. 12A, the interface 240 includes a button 242 having an option 244 for displaying selectable options, a search field 246 for entering a query, a search button 248, a search with guide button 250, a logon link 254 and an update button 256. The interface 240 includes a display portion 252 indicating a number of guides registered to the system 20 (FIG. 1). For example, at any given time, thousands of guides may be registered to handle searches received by the system 20 (FIG. 1) and may be indicated using a string having a current version of an application and an integer representative of the number of registered guides.

The search button 248 enables a search without necessitating assistance from guide(s) and the search with guide button 250 enables submission of a query to guide(s) registered to the system 20 (FIG. 1) to handle searches. Accordingly, a user is provided with an option of submitting a query for a guide assisted search via the search with guide button 250 or executing a search without necessarily submitting the query to a guide using the search button 248. The interface 240 indicates when there is an update as indicated by the update button 256 and includes the login link 254 that directs a user to the system 20 (FIG. 1). Although access to the system 20 (FIG. 1) is illustrated using the login link 254 in FIG. 12A, access to the system 20 may be triggered, for example, by selecting a menu option.

The interface 260 shown in FIG. 12B includes selectable menu options 262 including a GUI component 264 triggering access to the system 20 (FIG. 1) and an option button 266 that directs a user to the system 20 when selected and a query field 246a. As shown in FIG. 12B, the GUI component 264 and the option button 266 may be added to existing interfaces such as toolbars provided by search engines (i.e., Yahoo®, MSN®, etc.,) or other similar interfaces to invoke functions of the system 20 (FIG. 1). For example, the option button 266 and an installation script may be created using an application program interface (API) of a conventional search engine where the installation script resides in an XML document on a web server that may be linked to a web site of the system 20 (FIG. 1).

When a user selects the option button 266, a query entered in the query field 246a may be captured and sent to the system 20 (FIG. 1). The option button 266 may also be provided with a mouseover function indicating a search capability of the system 20 (with or without a guide). The GUI component 264 may be embedded into existing selectable menu options 262 using, for example, Firefox installer. Further, interfaces 240 and 260 may be implemented using with conventional browsers Internet Explorer (Win), IE 7 (Win), Firefox 1.5 (Win/ Mac) or other applications with similar capabilities.

Figure 13:
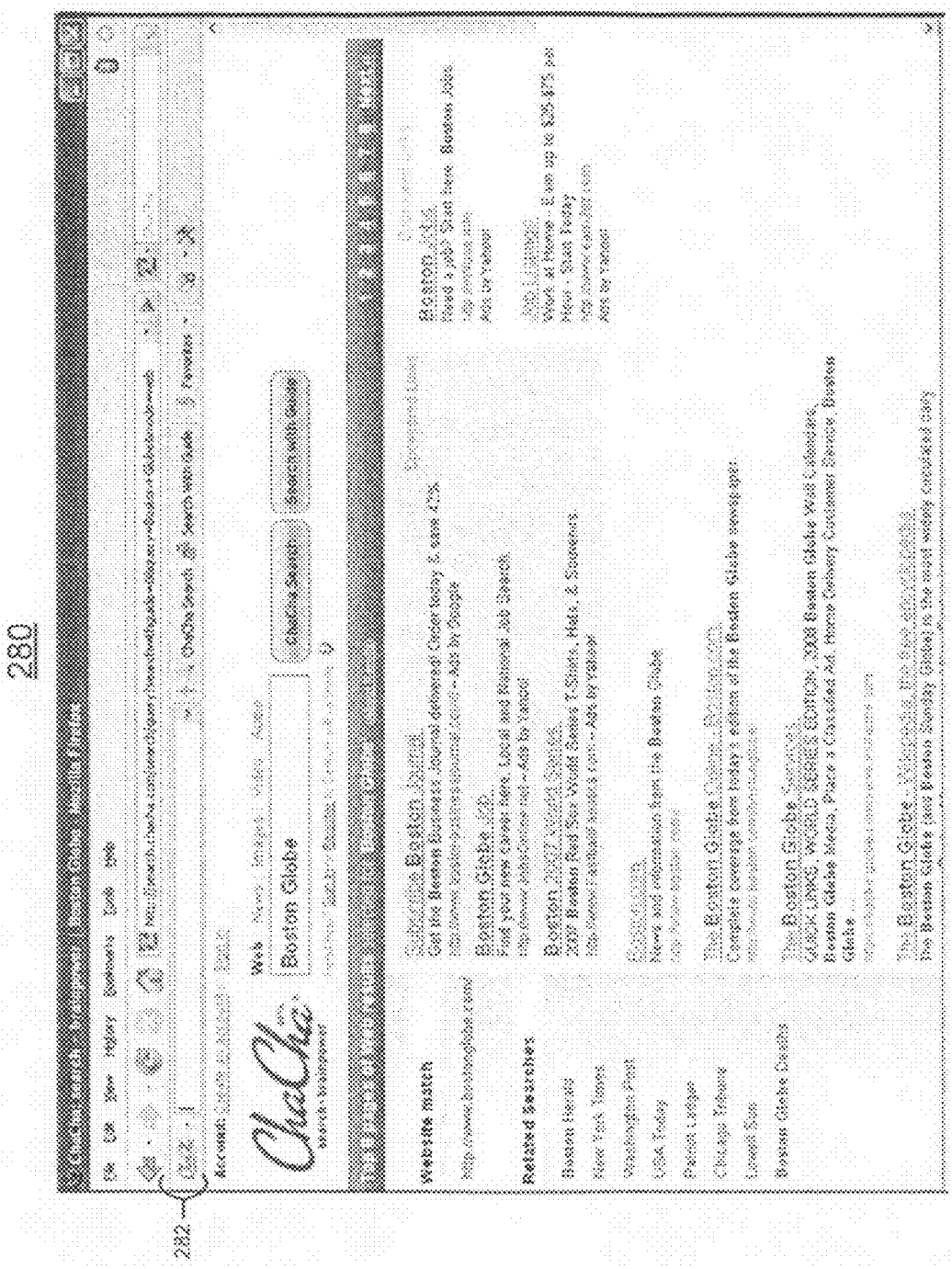
FIG. 13 is an exemplary search interface for executing searches.

FIG. 13 illustrates interface 280 for executing searches. As shown in FIG. 13, the interface 280 includes a toolbar 282 using which a user may request a search without necessitating guide assistance and a search with a guide subsequent to being presented with results of a search. As explained with respect to FIGS. 7C and 7D, a user may submit a query where automated results using algorithmically-selected and/or human-selected resources may be provided. The user may then use the toolbar 282 shown in FIG. 13 to submit the query for conducting a search with a guide. Alternatively, the user may subsequently select a "search with a guide" or "give me a live guide now" button on the web page or pages of automated results.

Figure 14:
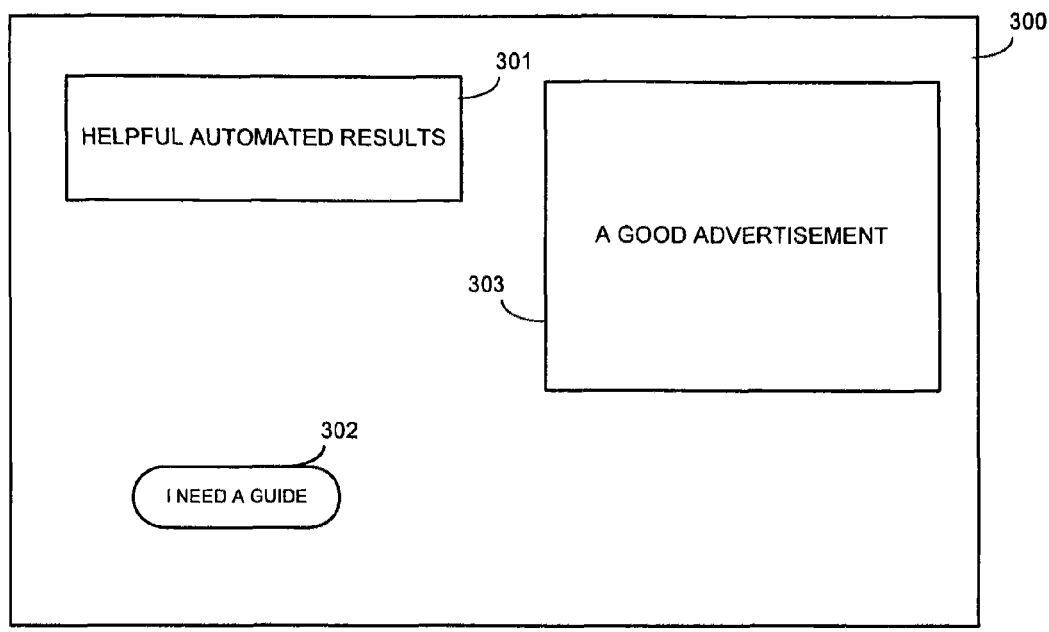
FIG. 14 is an exemplary user interface for providing automated results with an option for requesting a guide-assisted search.

FIG. 14 illustrates a user interface 300 for providing automated results with an option for requesting a guide-assisted search. For example, if after pre-filtering by an automated search, the system 20 (FIG. 1) determines that a user desires to perform a human-assisted search, the interface 300 shown in FIG. 14 is presented to the user. As shown in FIG. 14, the user interface 300 includes a results window 301 for presenting automated search results and a window 303 for providing an advertisement relevant to the topic. The user may then select to search with a guide using a button 302 (or other similar mechanism) for submitting the query to a guide.

Accordingly, optional use of human guide(s) for a search is provided where a user selects between submitting a query to human guide(s), initiating the search without assistance from the human guide(s), or a combination of both.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope thereof. It will further be understood that the phrase "at least one of A, B and C" may be used herein as an alternative expression that means "one or more of A, B and C."

What is claimed is:

1. A computer-implemented method, comprising:
receiving from a user a query and a selection between a search assisted by a human searcher and an automated search;
performing a search responsive to the selection by directing the query to an automated search resource most likely to produce a search result relevant to the query when the selection indicates the automated search wherein the search result for the search is automatically generated using stored information of a search by the human searcher responsive to a search request associated with a keyword of the query when the user selects the automated search and to a human searcher when the selection indicates the search assisted by the human searcher;
providing a search result of the automated search resource to the human searcher when the selection indicates the search assisted by the human searcher; and
providing a response to the user.

2. The computer-implemented method according to claim 1, further comprising:
returning information obtained from a resource configured by at least one human searcher, the at least one human searcher being selected based on a keyword of the query in response to the search when the user selects the search assisted by the human searcher.

3. The computer-implemented method according to claim 1, wherein the stored information is a ranking of a previous search result obtained by the human searcher.

4. The computer-implemented method according to claim 1, wherein the user selects between the search assisted by the human searcher and the automated search via a plurality of mutually exclusive controls indicating the selection to the user, the controls being provided simultaneously in a window indicating the query.

5. The computer-implemented method according to claim 1, wherein the automated search resource is selected based on a ranking of the human searcher among a plurality of human searchers registered for a keyword associated with the query.

6. The computer-implemented method according to claim 5, wherein the automated search resource is a search engine and the search engine is selected most frequently by the plurality of human searchers responding to queries requesting human assistance.

7. The computer-implemented method according to claim 6, further comprising:
   extracting one or more keywords from the query based on a ranking of a limited subset of keywords; and
   determining a subject matter of the query based on the one or more keywords and directing the query to a highest ranking searcher associated with said one or more keywords when the search assisted by the human searcher is selected.

8. The computer-implemented method according to claim 7, wherein the human searchers selecting the automated search resource are registered to conduct searches for requests including the one or more keywords.

9. The computer-implemented method according to claim 8, wherein the automated search resource is utilized by a predetermined number of human searchers registered to conduct searches related to the one or more keywords.

10. A computer-implemented method, comprising:
    allowing a user to enter a query;
    initiating an automated search using the query by submitting the query to a search engine most likely to produce a search result relevant to the query; and
    enabling an option for the user to select a search assisted by a human searcher for the query when determining that the automated search using the query has been performed and when determining that a search result obtained by a human assistant for the query is received by the user wherein the search result for the search is automatically generated using stored information of a search by the human searcher responsive to a search request associated with a keyword of the query when the user selects the automated search.

11. A persistent computer readable medium storing instructions therein for causing a computer to perform an operation, comprising:
    providing a command for submitting a query to a human searcher to conduct a search for a user requesting assistance with the search when determining that the user has received a response provided by a human assistant for the query;
    delivering to the human searcher performing the search a search result of an automated search resource previously determined by the human searcher to be most likely to produce a response pertinent to a keyword of the query, wherein the automated search resource is configured by the human searcher; and
    enabling the user to initiate an automated search for the query including submitting the query to the automated search resource, wherein the search result for the search is automatically generated using stored information of a search by the human searcher responsive to a search request associated with a keyword of the query when the user selects the automated search.

12. A computer-implemented method of providing optional use of a human searcher for a search, comprising:
    determining whether a control selected by a user indicates to the user that a query from the user is requested to be searched by the human searcher;
    generating a first result based on a real-time search conducted by the human searcher when determining that the control indicates to the user that the query is requested to be searched by the human searcher and a second result based on stored information when determining that the control does not indicate to the user that the query is requested to be searched by the human searcher, where the second result is obtained in accordance with a search performed using an algorithmic search resource configured by the human searcher, wherein the search result for the search is automatically generated using stored information of a search by the human searcher responsive to a search request associated with a keyword of the query when the user selects the automated search; and
    providing the first result or the second result to the user based on the control.

13. A computer-implemented method of submitting a query comprising:
    analyzing a query entered by a user;
    providing a plurality of actions indicating to the user a plurality of search types for the query entered by the user when said analyzing indicates that the query is equivalent to a previous query of the user and that the user has received a response to the query provided by a human assistant; and
    directing the query to a human searcher for a search when determining that an action indicating, to the user, a human assisted search is associated with the query and directing the query to a search engine selected as most likely to produce a relevant result by the human searcher for a subject matter of the query when determining that the action indicating, to the user, an automated search is associated with the query, wherein a search result for the search is automatically generated using stored information of a search by the human searcher responsive to a search request associated with a keyword of the query when the user selects the automated search.

14. A computer interface, comprising:
    a field provided via a display device for entering a query from a user to be searched; and
    a selection control indicating to the user whether the query will be searched by one of a human searcher or automatically, the selection control causing an automated search for the query using a search resource selected by a human assistant registered for a keyword of the query responsive to activation of the selection control and directing the query and the result of the automated search to the human searcher when determining that the selection control indicates to the user that the query will be searched by the human searcher, wherein the search result for the search is automatically generated using stored information of a search by the human searcher responsive to a search request associated with a keyword of the query when the user selects the automated search.

15. The computer interface according to claim 14, wherein the selection control comprises:
    a guide assisted search button indicating to the user an assisted search by the human searcher; and
    an automatic search engine search button indicating to the user the automated search performed by directing the query to a search engine selected by the human searcher, wherein the guide assisted search button and the automatic search engine button are presented simultaneously and are mutually exclusive.

16. The computer interface according to claim 15, wherein the selection control further comprises:
    a parallel search button indicating to the user a parallel search performed by simultaneously initiating both the assisted search by the human searcher and the automated search performed by directing the query to the search engine search for the query, and providing results of the automated search to the human searcher and the user, and wherein the guide assisted search button and the automatic search engine button and the parallel search button are presented simultaneously and are mutually exclusive.

17. A system, comprising:
a user device allowing a user to enter a query and receive instructions of a first action initiating an automated search and a second action initiating a search by a human searcher and receiving a response for the query;
a searcher system receiving the query and obtaining a search result responsive to the second action;
a resource system from which the searcher system retrieves a search result; and
a search system receiving the query, selecting the resource system as most likely to be relevant based on stored search results of the resource system and submitting the query to the resource system responsive to the first action or the second action and by submitting the query to the searcher system responsive to the second action, wherein the search result for the search is automatically generated using stored information of a search by the human searcher responsive to a search request associated with a keyword of the query when the user selects the automated search.

18. A computer-implemented method, comprising:
allowing a user to enter a query and one of a plurality of mutually exclusive indicators provided to the user, the plurality of indicators including a first indicator of a search assisted by a human searcher, a second indicator of an automated search and a third indicator of simultaneously performing the search assisted by the human searcher and the automated search;
directing the query to an automated search resource selected as a default resource for the query when determining that the second indicator or the third indicator is entered;
directing the query to the human searcher and providing a stored search result for the query to the human searcher when determining that the first indicator or the third indicator is entered;
directing the query to a resource configured by the human searcher when determining that the second indicator is entered;
providing a result automatically generated based on stored information of a search by the human searcher responsive to a search request associated with a keyword of the query to the user when the second indicator or the third indicator is entered; and
providing a response of the human searcher to the user when the first indicator or the second indicator is entered.

19. A search apparatus for providing optional use of human search guides, comprising:
a storage device maintaining a record of default or previously used resources in association with a keyword including at least one resource selected by a system administrator, said maintaining including resources used and selected by human search guides;
a user device displaying a control indicating to the user initiating a search for a query, and providing an option to perform a human aided search when determining that a search result provided by a human assistant responsive to the query has been received;
a server processing the query using the recorded default or previously used resources, selecting the resources based on a rating of search results obtained from the recorded default or previously used resources found by the human search guides when responding to search requests indicating the keyword when the control is activated, directing the query to a human searcher when the option is selected, wherein a search result for the search is automatically generated using stored information of a search by the human searcher responsive to a search request associated with a keyword of the query when the control is activated and providing a response to the user device; and
a guide system operated by the human searcher to obtain the search result.

20. A computer-implemented search method comprising:
receiving a query from a user;
obtaining, by a human searcher, from a resource configured by the human searcher, a search result associated with a keyword;
providing, to the user, a first instruction for submitting the query to the human searcher, the human searcher being selected using a rating of said human searcher for the keyword and providing, to the user, a second instruction for conducting the search without requesting assistance of said human searcher by submitting the query to the resource;
performing a search for the query using the resource when the second instruction is received, wherein the search result for the search is automatically generated using stored information of a search by the human searcher responsive to a search request associated with a keyword of the query when the second instruction is received; and
selecting a highest ranking human searcher for the query when the first instruction is received.

21. The computer-implemented search method according to claim 20, wherein predefined resources configured by the user are utilized to return automated results when the first instruction is received.

22. A computer-implemented method, comprising:
receiving a query for a search from a user;
instructing the user to perform a first action to initiate a human assisted search;
instructing the user to perform a second action to initiate an automated search; and
returning one or more results from information maintained by at least one search engine indexing search results gathered by a human searcher when the user performs the second action, submitting the query to a selected relevant automated search engine when the user performs the second action, wherein the search result for the search is automatically generated using stored information of a search by the human searcher responsive to a search request associated with a keyword of the query when the user performs the second action and simultaneously directing the query to an automated search resource and the human searcher when the user performs the first action.

23. The computer-implemented method according to claim 22, wherein the one or more results are obtained using spidering or page ranking.

24. A computer-implemented method, comprising:
allowing a user to enter a query in an interface linked to a first destination, the first destination being indicated to the user;
redirecting the query to a second destination when a control identifying to the user the second destination is activated by the user; and
presenting a result for the query in accordance with a search performed using a selected automated search resource accessed by a human assistant;

presenting the result to the user when the query is received at the first destination wherein the result for the query is automatically generated using stored information of a search by the human assistant responsive to a search request associated with a keyword of the query when the when the query is received at the first destination; and presenting the result to the human assistant when the query is received at the second destination.

25. The computer-implemented method according to claim 24, wherein the control comprises an action control including a symbol indicating a human assisted search, and the action control is not provided to the user when determining that the query has not been received from the first user at the first destination or that a result of a human assisted search for the query has not been provided to the user.

26. A computer-implemented method, comprising:
receiving a search request from a query source;
providing a first control indicating to a user an automated search;
providing a second control indicating to the user a search by a human searcher;
performing a search for the search request received using a search engine selected by the human searcher and activated based on content of the search request when the first control or the second control is activated wherein the search result for the search is automatically generated using stored information of a search by the human searcher responsive to a search request associated with a keyword of the query when the user selects the first control;
performing a search assisted by the human searcher when the second control is activated; and
providing a result for the search request to the query source.

27. A computer-implemented method, comprising:
describing a group of actions comprising a first action described as initiating a human assisted search, a second action described as initiating an automated search and a third action described as initiating a parallel search;
receiving a request associated with a member of the group of actions;
sending a notification to a plurality of human searchers of the request in an order based on a ranking of the human searchers for the request and selecting a first human searcher to respond to the notification of the request and directing the request to the human searcher when the member is the first action or the third action;
obtaining a search result produced by an automated search resource selected based on content of the request when the member is the second action or the third action, wherein the search result for the request is automatically generated using stored information of a search by the human searcher responsive to a search request associated with a keyword of the query when the member is the first action; and
displaying a response selected based on the member to a user who submitted the request.

* * * * *